US006898303B2

(12) United States Patent
Armato, III et al.

(10) Patent No.: US 6,898,303 B2
(45) Date of Patent: May 24, 2005

(54) METHOD, SYSTEM AND COMPUTER READABLE MEDIUM FOR THE TWO-DIMENSIONAL AND THREE-DIMENSIONAL DETECTION OF LESIONS IN COMPUTED TOMOGRAPHY SCANS

(75) Inventors: Samuel G. Armato, III, Downers Grove, IL (US); Maryellen L. Giger, Elmhurst, IL (US); Heber Macmahon, Chicago, IL (US)

(73) Assignee: Arch Development Corporation, Chicago, IL (US)

( * ) Notice: Subject to any disclaimer, the term of this patent is extended or adjusted under 35 U.S.C. 154(b) by 737 days.

(21) Appl. No.: 09/759,333

(22) Filed: Jan. 16, 2001

(65) Prior Publication Data

US 2002/0006216 A1 Jan. 17, 2002

Related U.S. Application Data

(60) Provisional application No. 60/176,304, filed on Jan. 18, 2000.

(51) Int. Cl.$^7$ ................................. G06K 9/00
(52) U.S. Cl. ...................... 382/131; 382/285; 600/425; 378/21
(58) Field of Search ............................ 604/20; 600/425, 600/407; 345/653, 654; 382/128, 129, 130, 131, 132, 133, 134, 156, 162, 169, 173, 203, 214, 289, 168, 177, 194, 199, 219, 224, 237, 243, 275, 282, 285, 305; 378/8, 21, 23, 28; 250/455, 370.09; 377/10

(56) References Cited

U.S. PATENT DOCUMENTS 4,907,156 A    3/1990  Doi et al.
5,133,020 A  * 7/1992  Giger et al. ............... 382/128
5,289,374 A  * 2/1994  Doi et al. .................. 600/407

OTHER PUBLICATIONS

Jyh-Shyan Lin "an application of convolution neural networks: reducing false-positives in lung nodule detetion", university of Maryland, college park,MD 20742, 1995 IEEE.*

Armato III, Samuel G., "Three Dimensional Approach to Lung Nodule Detection in Helical CT," Proceedings of the SPIE, San Diego, CA, Feb. 1999, SPIE vol. 3661, pp. 553–559.

U.S. Appl. No. 09/759,333, filed Jan. 16, 2001, Armato et al.

U.S. Appl. No. 10/793,799, filed Mar. 8, 2004, Giger et al.

Primary Examiner—Bhavesh M. Mehta
Assistant Examiner—Seyed Azarian
(74) Attorney, Agent, or Firm—Oblon, Spivak, McClelland, Maier & Neustadt, P.C.

(57) ABSTRACT

A method, system and computer readable medium for automated detection of lung nodules in computed tomography (CT) image scans, including generating two-dimensional segmented lung images by segmenting a plurality of two-dimensional CT image sections derived from the CT image scans; generating three-dimensional segmented lung volume images by combining the two-dimensional segmented lung images; determining three-dimensional lung nodule candidates from the three-dimensional segmented lung volume images, including, identifying structures within the three-dimensional segmented lung volume images that meet a volume criterion; deriving features from the lung nodule candidates; and detecting lung nodules by analyzing the features to eliminate false-positive nodule candidates from the nodule candidates.

37 Claims, 12 Drawing Sheets

U.S. PATENT DOCUMENTS

| | | |
|---|---|---|
| 5,452,367 A | 9/1995 | Bick et al. |
| 5,537,485 A | 7/1996 | Nishikawa et al. |
| 5,562,608 A * | 10/1996 | Sekins et al. .................. 604/20 |
| 5,638,458 A | 6/1997 | Giger et al. |
| 5,657,362 A | 8/1997 | Giger et al. |
| 5,832,103 A | 11/1998 | Giger et al. |
| 5,881,124 A * | 3/1999 | Giger et al. .................... 378/8 |
| 5,974,165 A * | 10/1999 | Giger et al. ................. 382/132 |
| 5,984,870 A | 11/1999 | Giger et al. |
| 6,112,112 A * | 8/2000 | Gilhuijs et al. ............. 600/425 |
| 6,138,045 A * | 10/2000 | Kupinski et al. ........... 600/425 |
| 6,141,437 A | 10/2000 | Xu et al. |
| 6,185,320 B1 * | 2/2001 | Bick et al. .................. 382/132 |

* cited by examiner

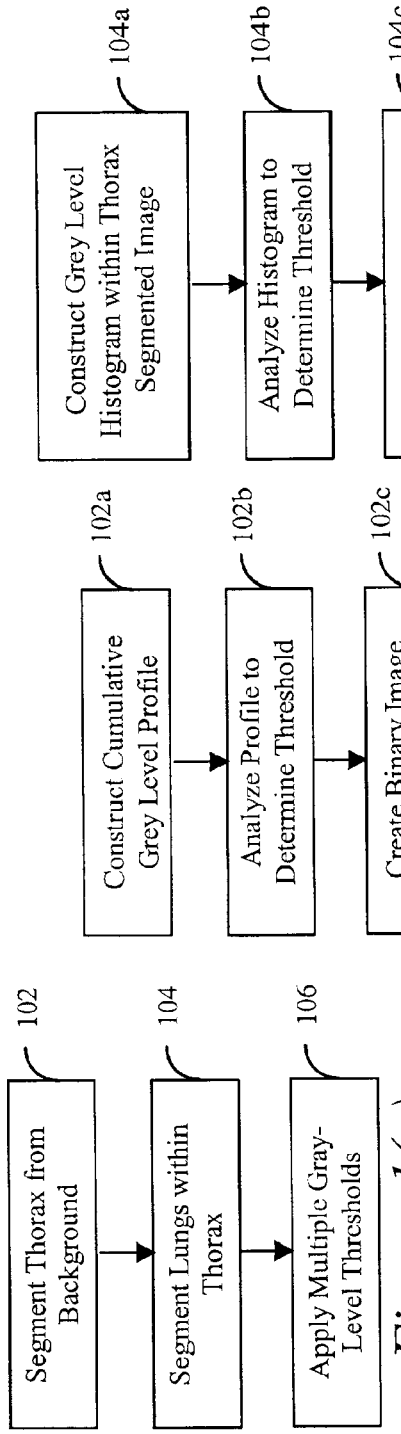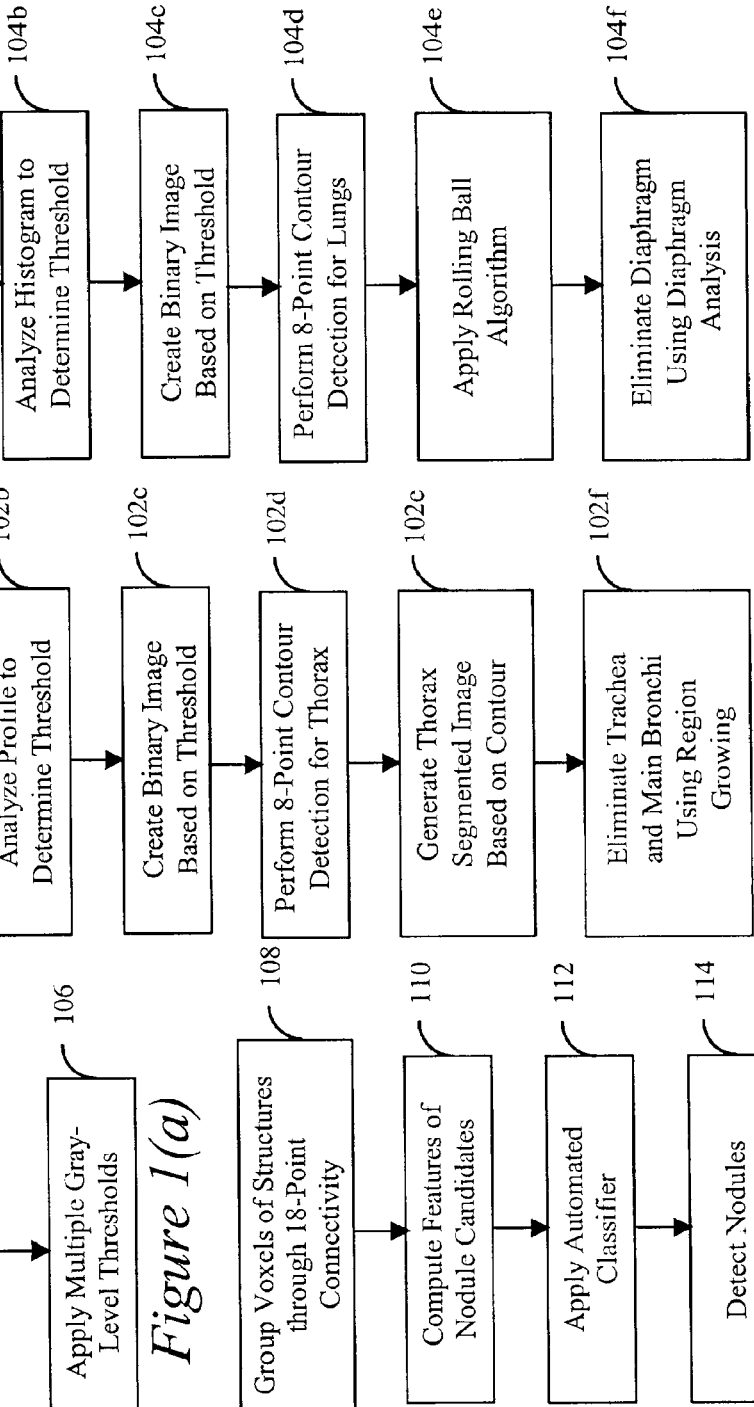
Figure 1(a)
Figure 1(b)
Figure 1(c)
Figure 1(d)

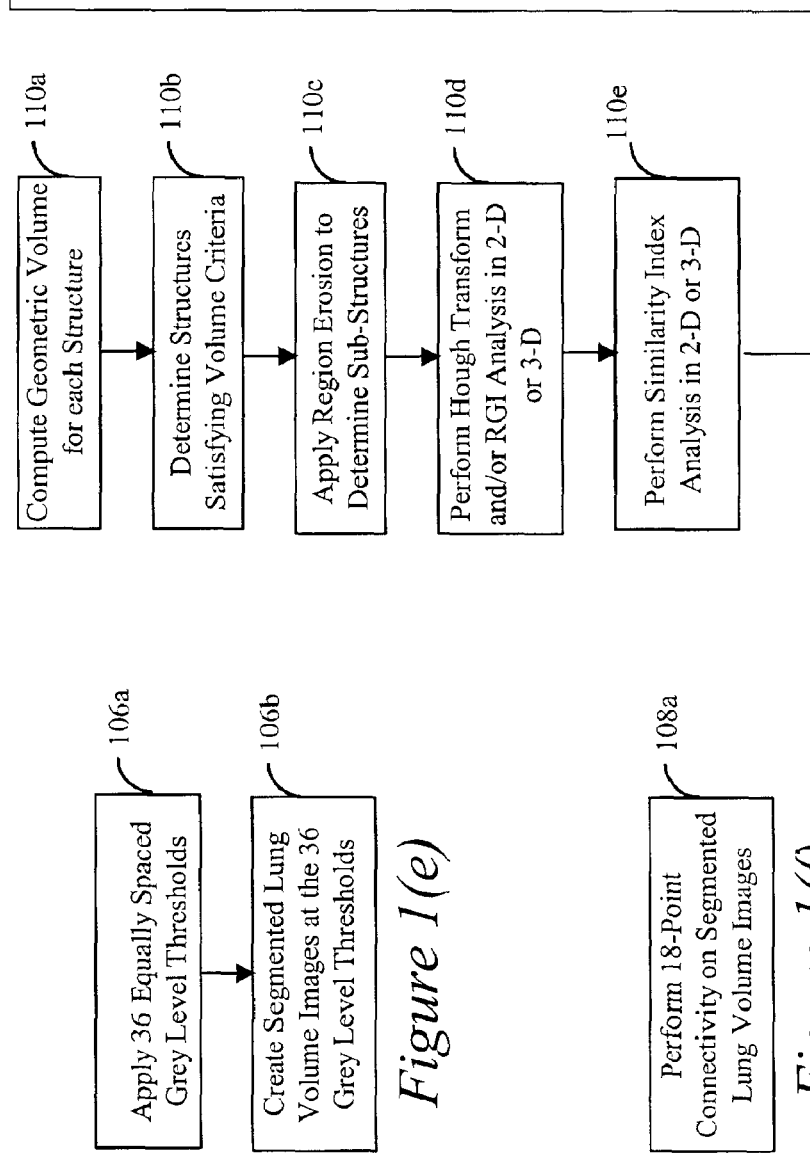
*Figure 1(g)*
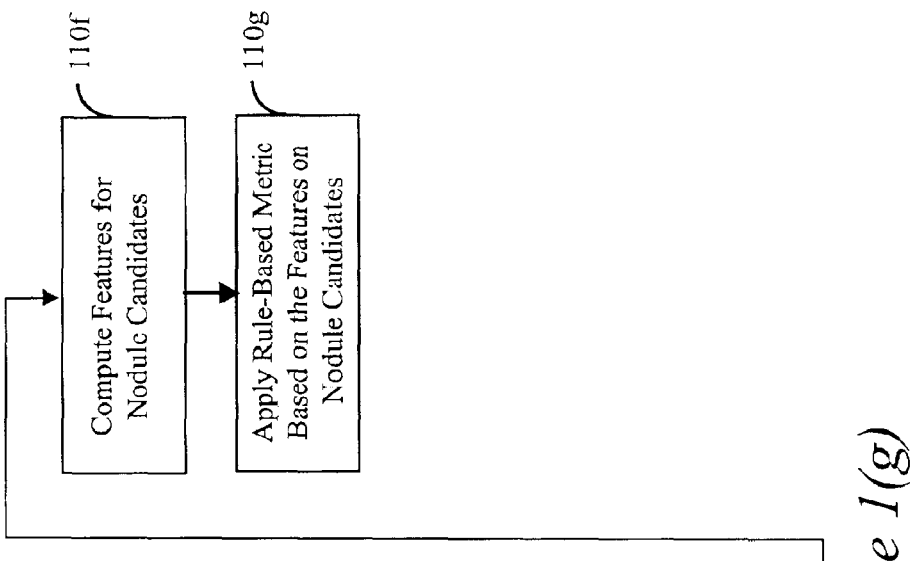
*Figure 1(e)*
*Figure 1(f)*

Apply Automated Classifier on Features of Remaining Nodule Candidates — 112a

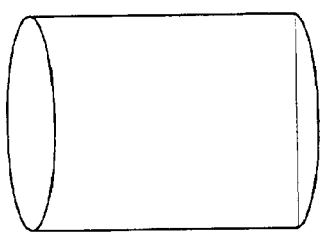
*Figure 8(d)*
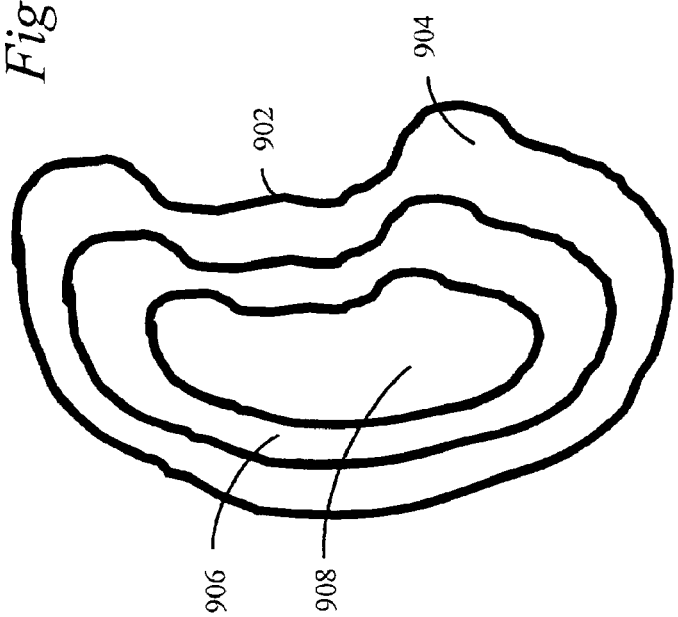
*Figure 9*
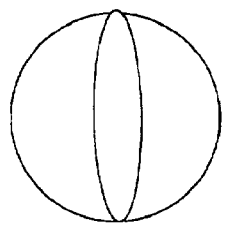
*Figure 8(c)*
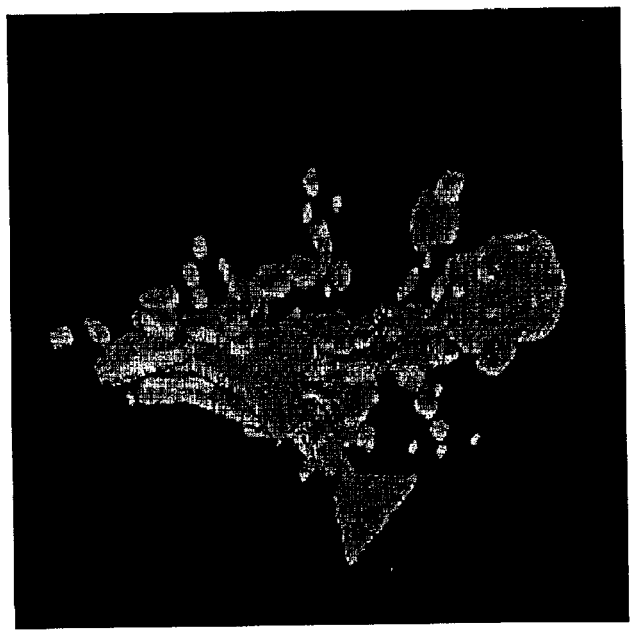
*Figure 7(b)*
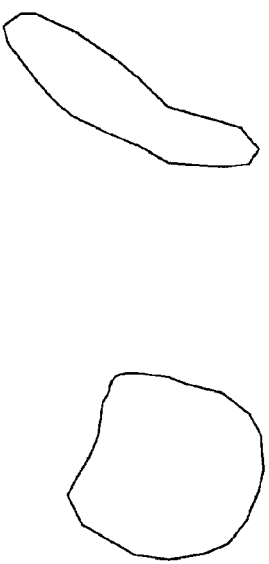
*Figure 8(b)*
*Figure 8(a)*

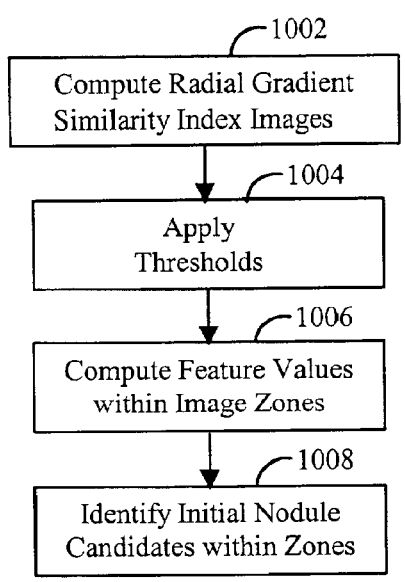
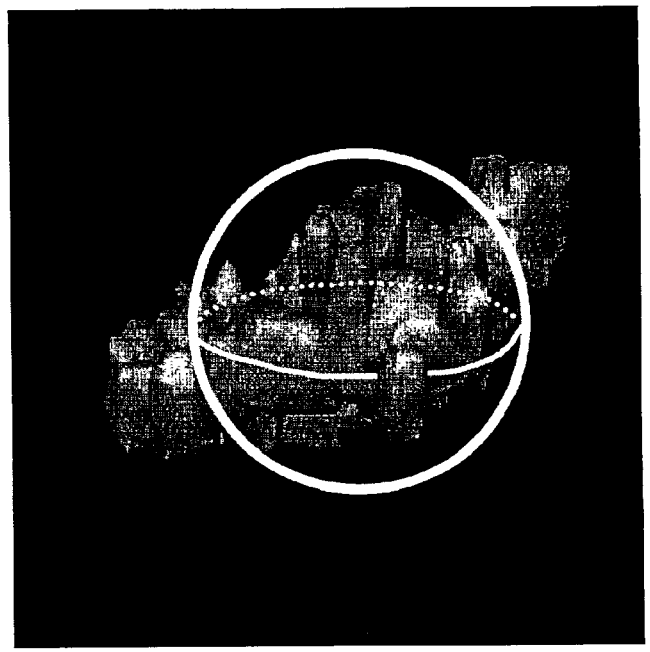
Figure 10              Figure 11
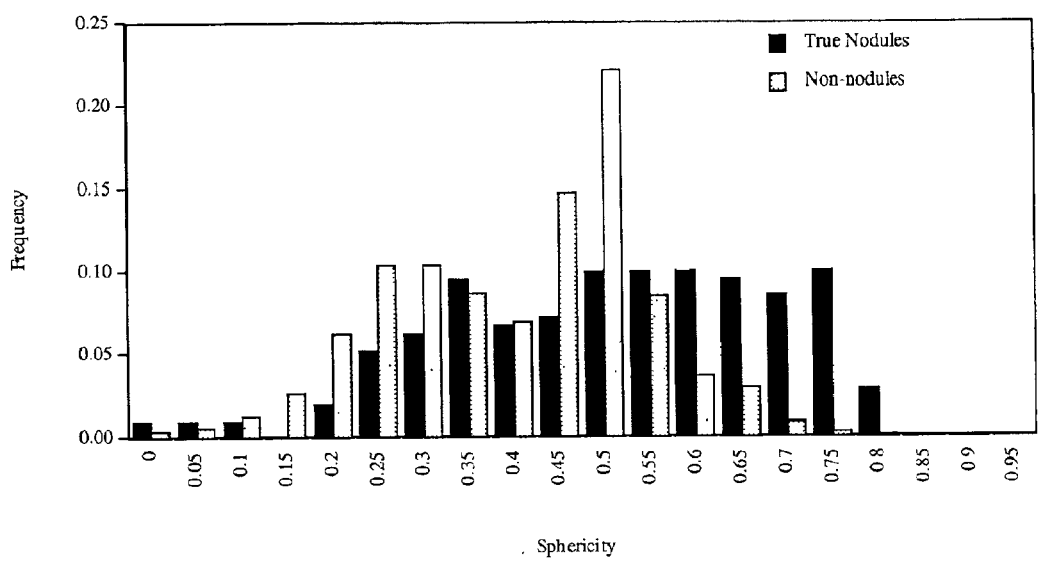
Figure 12(a)

METHOD, SYSTEM AND COMPUTER READABLE MEDIUM FOR THE TWO-DIMENSIONAL AND THREE-DIMENSIONAL DETECTION OF LESIONS IN COMPUTED TOMOGRAPHY SCANS

CROSS-REFERENCE TO RELATED APPLICATIONS

This application claims priority under 35 U.S.C. §119(e) to U.S. provisional patent application Ser. No. 60/176,304, filed on Jan. 18, 2000, the entire contents of which is incorporated by reference herein.

STATEMENT REGARDING FEDERALLY SPONSORED RESEARCH

The present invention was made in part with U.S. Government support under USPHS grant numbers CA48985, CA62625, CA64370, and RR11459 (National Institute of Health). The U.S. Government has certain rights in the invention.

BACKGROUND OF THE INVENTION

1. Field of the Invention

The present invention relates generally to a computerized method and system to aid radiologists in detection of abnormalities in tomography scans.

The present invention also generally relates to computerized techniques for automated analysis of digital images, for example, as disclosed in one or more of U.S. Pat. Nos. 4,839,807; 4,841,555; 4,851,984; 4,875,165; 4,907,156; 4,918,534; 5,072,384; 5,133,020; 5,150,292; 5,224,177; 5,289,374; 5,319,549; 5,343,390; 5,359,513; 5,452,367; 5,463,548; 5,491,627; 5,537,485; 5,598,481; 5,622,171; 5,638,458; 5,657,362; 5,666,434; 5,673,332; 5,668,888; 5,732,697; 5,740,268; 5,790,690; 5,832,103; 5,873,824; 5,881,124; 5,931,780; 5,974,165; 5,982,915; 5,984,870; 5,987,345; and 6,011,862; as well as U.S. patent application Ser. Nos. 08/173,935; 08/398,307 (PCT Publication WO 96/27846); 08/536,149; 08/562,087; 08/900,188; 08/900,189; 08/900,191; 08/900,361; 08/979,623; 08/979,639; 08/982,282; 09/027,468; 09/027,685; 09/028,518; 09/053,798; 09/092,004; 09/121,719; 09/131,162; 09/141,535; 09/156,413; 09/298,852; and 09/471,088; PCT patent applications PCT/US99/24007; PCT/US99/25998; and U.S. provisional patent application No. 60/160,790 and Attorney Docket Number 0730-0069-20 PROV filed on Jan. 18, 2000, all of which are incorporated herein by reference. Of these patents and applications, U.S. Pat. Nos. 5,463,548; 5,622,171; 5,732,697; and 5,873,824; patent application Ser. Nos. 08/562,087; 08/900,361; and 09/027,685; and U.S. provisional patent application No. 60/160,790 and Attorney Docket Number 0730-0069-20 PROV filed on Jan. 18, 2000 are of particular interest.

The present invention includes use of various technologies referenced and described in the above-noted U.S. Patents and Applications, as well as described in the references identified in the appended LIST OF REFERENCES by the author(s) and year of publication and cross-referenced throughout the specification by numerals in brackets corresponding to the respective references, the entire contents of which, including the related patents and applications listed above and references listed in the LIST OF REFERENCES, are incorporated herein by reference.

2. Discussion of the Background

Lung cancer will result in an estimated 158,900 deaths in the United States in 1999 and ranks as the leading cause of cancer death in American men and women [1]. Lung cancer is responsible for an estimated 15% of new cancer cases in men (second only to prostate cancer) and 13% of new cancer cases in women (second only to breast cancer) [1]. Some evidence suggests that early detection of lung cancer may allow for more timely therapeutic intervention and hence a more favorable prognosis for the patient [2, 3].

An estimated 30–40% of potentially detectable lung cancers are missed by radiologists using conventional chest radiographs [4]. It is widely recognized, however, that the sensitivity of computerized tomography (CT) scans for lung nodule detection is superior to that of chest radiography [5–7]. For this reason, the CT scan is generally regarded as the "gold standard" for confirming the presence of a nodule. The most important advantage of CT is its ability to distinctly represent anatomic structures that would otherwise project in superposition in a chest radiograph; CT scans acquire three-dimensional volumetric data, while the image captured by a radiograph collapses real-world objects (i.e., patient anatomy) into two dimensions. The practical consequence of this difference in imaging approaches is that the average size of peripheral cancers missed by radiologists on CT scans was found to be 0.3 cm compared with 1.3 cm at radiography [8].

Although the potential camouflaging effect of overlapping anatomic structures is effectively eliminated in CT scans, identification of small lung nodules is still confounded by the prominence of blood vessels in CT images. Croisille et al. [9] demonstrated a significant improvement in radiologists' detection of nodules when vessels were removed from the images through region growing in three dimensions. Distinguishing between nodules and vessels typically requires visual comparison among multiple CT sections, each of which contains information that must be evaluated by a radiologist and assimilated into the larger context of the volumetric data acquired during the scan. This process could lead to fatigue or distraction, especially when other abnormalities are present [10]. The evaluation of CT scans for lung nodules requires the radiologist to mentally construct a three-dimensional representation of patient anatomy based on over 50 images acquired during the examination. This task, while cumbersome for radiologists, may be efficiently handled by a computerized method.

Despite the number of images that must be interpreted to detect nodules in CT scans, few investigators have participated in the development of computer-aided diagnostic (CAD) techniques for this task [11–15]. Ryan et al. [12] modeled nodules and vessels as spherical and cylindrical volumes, respectively. A comparison between soft tissue and air densities on the surface and within the volume of a bounding cube was used to differentiate nodules and vessels. Their method attained a sensitivity of 100% on an unspecified number of cases with an unreported number of false positives per case.

Kanazawa et al. [13] utilized a fuzzy clustering algorithm to identify vessels and potential nodules. A rule-based approach that incorporated distance from the lung boundary and circularity information was used to distinguish nodules from vessels in each section. The reported results appear to indicate that their algorithm attained a sensitivity of 86% with 11 false positive cases for a database of 224 cases.

Okumura et al. [14] used spatial filtering to automatically detect nodules. In a database of 82 cases, all 21 nodules were detected along with 301 false-positive regions.

Giger et al. [11] developed an automated detection scheme based on a database of eight CT scans. To distin guish nodules from vessels within the lung regions, geometric feature analysis was implemented in conjunction with multiple gray-level thresholding. Final classification was made based on a comparison of suspected regions in each section with suspected regions in adjacent sections. The method performed at a level of 94% sensitivity with an average of 1.25 false-positive detections per case.

More recently, Armato et al. [15, 16] applied the above method to a database of 17 helical CT scans and extended the method to include an artificial neural network (ANN) [17] to distinguish between nodules and vessels. Receiver operating characteristic (ROC) analysis [18] was used to evaluate the ability of the ANN to distinguish between nodules and non-nodules among the candidates selected within the segmented lung regions. The area under the ROC curves attained average values between 0.90 and 0.99.

A three-dimensional approach was reported by Armato et al. [19, 20] for a 17-case database. Linear discriminant analysis to classify identified nodule candidates as nodule or non-nodule yielded an overall nodule detection performance of 70% sensitivity with an average of three false-positive detections per section. Three-dimensional features were found to substantially contribute to the discrimination ability of the linear discriminant analysis classifier.

Fiebich et al. [21] recently developed a computerized method for the detection of lung nodules in low-dose helical CT scans from a lung cancer screening program. The method attained an overall nodule detection sensitivity of 95.6% with approximately 15 false-positive detections per study. Other investigators have contributed recently to the important task of computerized lung nodule detection in CT images [22–24].

Many institutions use a helical CT protocol in which image data is continuously acquired as the patient table is translated through the scanner [25]. Helical CT offers several advantages over the "step-and-shoot" acquisition of conventional CT, including decreased scanning time, improved patient throughput, reduced motion artifacts, the ability to perform a single-breath-hold scan, and the ability to retrospectively select the planes of image reconstruction [26]. These last two advantages are of particular importance to lung nodule detection. A scan performed during a single breath hold eliminates misregistration that may occur between sections due to respiration differences, and the ability to retrospectively select reconstruction planes allows for images that optimally capture a region of interest. Consequently, the major causes of false-negative conventional CT examinations may be eliminated with helical CT [27]. The sensitivity of helical CT for detection of nodules by radiologists is significantly superior to that of conventional CT, leading investigators to rate helical CT as the preferred radiologic modality for the detection of lung nodules [27].

The advantages of helical CT could result in its implementation as a modality for lung cancer screening [28]. Moreover, scans may be acquired with lower x-ray exposure to reduce the dose to screened individuals [29, 30]. Trials to validate lung cancer screening with low-dose helical CT are currently underway in the United States [31], Germany, and Japan [14].

However, due shortcomings in the above-noted methods, an improved method for the detection of lung nodules in thoracic CT scans is desirable.

SUMMARY OF THE INVENTION

Accordingly, an object of this invention is to provide an improved method, system and computer readable medium for the detection of lung nodules in thoracic CT scans.

Another object of this invention is to provide an improved method, system and computer readable medium for the automated segmentation of lung nodules from volumetric image data acquired by thoracic CT scans.

Another object of this invention is to provide an improved method, system and computer readable medium for automated analysis of features derived for nodule candidates identified in thoracic CT scans.

These and other objects are achieved according to the present invention by providing a novel method, system and computer readable medium for automated detection of lung nodules in computed tomography (CT) image scans, including generating two-dimensional segmented lung images by segmenting a plurality of two-dimensional CT image sections derived from the CT image scans; generating three-dimensional segmented lung volume images by combining the two-dimensional segmented lung images; determining three-dimensional lung nodule candidates from the three-dimensional segmented lung volume images, including, identifying structures within the three-dimensional segmented lung volume images that meet a volume criterion; deriving features from the lung nodule candidates; and detecting lung nodules by analyzing the features to eliminate false-positive nodule candidates from the nodule candidates.

In another aspect of the present invention there is provided a novel method, system and computer readable medium for automated segmentation of lung regions from computed tomography (CT) image scans, including generating two-dimensional segmented lung images by segmenting a plurality of two-dimensional CT image sections derived from the CT image scans; and generating three-dimensional segmented lung volume images by combining the two-dimensional segmented lung images. The step of generating the segmented lung images includes the steps of generating two-dimensional segmented thorax images by segmenting the plurality of two-dimensional CT image sections, including, applying gray-level thresholds to the CT image sections to determine thorax region contours therein; and generating the two-dimensional segmented lung images by segmenting the segmented thorax images, including, applying gray-level thresholds to the segmented thorax images to determine the lung region contours therein.

In another aspect of the present invention there is provided a novel method, system and computer readable medium for automated segmentation of lung nodules in computed tomography (CT) image scans, including generating two-dimensional segmented lung images by segmenting a plurality of two-dimensional CT image sections derived from the CT image scans; generating three-dimensional segmented lung volume images by combining the two-dimensional segmented lung images; and determining three-dimensional lung nodule candidates from the three-dimensional segmented lung volume images, including, identifying structures within the three-dimensional segmented lung volume images that meet a volume criterion. The step of generating the segmented lung volume images includes generating the segmented lung images at a plurality of gray levels thresholds; and combining the segmented lung images to generate segmented lung volume images at a plurality of gray levels corresponding to the gray level thresholds.

In another aspect of the present invention there is provided a novel method, system and computer readable medium for automated detection of lung nodules in computed tomography (CT) image scans, including generating two-dimensional segmented lung images by segmenting a plurality of two-dimensional CT image sections derived from the CT image scans; generating three-dimensional segmented lung volume images by combining the two-dimensional segmented lung images; determining three-dimensional lung nodule candidates from the three-dimensional segmented lung volume images, including, identifying structures within the three-dimensional segmented lung volume images that meet a volume criterion; deriving features from the lung nodule candidates; and detecting lung nodules by analyzing the features to eliminate false-positive nodule candidates from the nodule candidates. The step of deriving the features from the lung nodule candidates includes applying radial gradient index analysis in two or three dimensions on the identified structures to identify false-positive nodule candidates; and the step of detecting the lung nodules comprises analyzing the radial gradient index to eliminate the false-positive nodule candidates from the nodule candidates.

In another aspect of the present invention there is provided a novel method, system and computer readable medium for automated detection of lung nodules in computed tomography (CT) image scans, including generating two-dimensional segmented lung images by segmenting a plurality of two-dimensional CT image sections derived from the CT image scans; generating three-dimensional segmented lung volume images by combining the two-dimensional segmented lung images; determining three-dimensional lung nodule candidates from the three-dimensional segmented lung volume images, including, identifying structures within the three-dimensional segmented lung volume images that meet a volume criterion; deriving features from the lung nodule candidates; and detecting lung nodules by analyzing the features to eliminate false-positive nodule candidates from the nodule candidates. The step of deriving the features from the lung nodule candidates includes applying similarity index analysis in two or three dimensions on the identified structures to compute a size of a nodule candidate relative to a distribution of sizes for neighboring nodule candidates; and the step of detecting the lung nodules comprises analyzing the similarity index to eliminate the false-positive nodule candidates from the nodule candidates.

In another aspect of the present invention there is provided a novel method, system and computer readable medium for automated analysis of features of lung nodules in computed tomography (CT) image scans, including generating two-dimensional segmented lung images by segmenting a plurality of two-dimensional CT image sections derived from the CT image scans; generating three-dimensional segmented lung volume images by combining the two-dimensional segmented lung images; determining three-dimensional lung nodule candidates from the three-dimensional segmented lung volume images, including, identifying structures within the three-dimensional segmented lung volume images that meet a volume criterion; and deriving features from the lung nodule candidates. The step of deriving the features from the lung nodule candidates includes determining features from the nodule candidates including at least one of structure volume, sphericity, radius of equivalent sphere, maximum compactness, maximum circularity, maximum eccentricity, mean gray level within structure, standard deviation of gray level and gray-level threshold at which structure volume first decreases below an upper volume bound.

The present invention further includes a computer readable medium storing program instructions by which the method of the invention can be performed when the stored program instructions are appropriately loaded into a computer, and a system for implementing the method of the invention.

The automated scheme for the detection of pulmonary nodules according to the present invention, advantageously, could provide substantial benefit in a screening program in which most cases will not contain nodules. Consequently, a computerized detection scheme, according to the present invention, implemented as a "second reader," advantageously, is expected to help radiologists focus their attention on cases with regions that are suspicious for lung cancer. Advantageously, such a scheme could also be used to direct radiologists to suspicious lesions that would merit immediate targeted high-resolution scans following detection on the initial low-dose scan. Thus, the automated detection scheme according to the present invention could become an integral component of future lung cancer screening protocols.

The present invention has significance in that: (1) CT scans are used increasingly for diagnostic evaluation of patients, and (2) lung cancer screening by low-dose helical CT is gradually gaining acceptance as a viable means of early lung cancer detection. However, the large amount of image data acquired during a single CT examination may quickly lead to "information overload" for the radiologists who must interpret this data. The recent development of multi-slice CT acquisition will soon further compound the image information problem. Consequently, the automated lung nodule detection method according to the present invention is believed to be a valuable aid to radiologists, thereby facilitating earlier diagnosis of lung cancer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings wherein:

FIGS. 1(a)–1(h) are flowcharts illustrating a method for the automated detection of lung nodules in thoracic CT scans including (a) analyses in two-dimensions followed by (b) analyses in three-dimensions, according to the present invention;

FIGS. 2(a) and 2(b) are images illustrating (a) an original section image and (b) corresponding segmented lung regions that are automatically extracted from the original section image, according to the present invention;

FIGS. 7(a) and 7(b) are images illustrating (a) volume rendering of a single three-dimensional structure identified by an 18-point connectivity scheme applied to a segmented lung volume created at a low gray-level threshold, according to the present invention, wherein a large volume of this structure fails to meet volume criterion and (b) within the segmented lung volume created at a higher gray-level threshold, the same structure dissociates into multiple smaller structures, many of which satisfy the volume criterion and will be included in the set of nodule candidates;

FIGS. 8(a), 8(b), 8(c) and 8(d) are diagrams illustrating how structures of different shape affect the radial gradient and depict the appropriate model for use with anisotropic image data, according to the present invention, wherein a circular structure such as a nodule (a) in two dimensions will yield a larger radial gradient index value than a linear structure such as a vessel (b), and for purposes of three-dimensional radial gradient index, a nodule may be modeled as a sphere when voxels are dimensionally isotropic (c) and since actual CT image data is acquired from anisotropic voxels, nodules must typically be modeled as cylindrical structures (d);

FIG. 9 is a diagram illustrating zones that are defined within a lung segmentation region for computation of a similarity index, according to the present invention, wherein a lung segmentation contour (outermost contour) has three spatial zones identified therein and relative values of features of structures within the individual zones are used to discriminate between nodules and normal anatomy;

FIG. 10 is a flowchart illustrating integration of a radial gradient index and a similarity index in two or three dimensions for identification of initial nodule candidates, according to the present invention;

FIG. 11 is an image illustrating a three-dimensional sphericity feature, defined as a fraction of a volume of a structure that is contained within an equivalent-volume sphere centered at the structure's center-of-mass, according to the present invention;

FIGS. 12(a) and 12(b) are graphs illustrating a distribution of (a) sphericity feature values and (b) pixel value standard deviation feature values for nodule candidates that correspond to true nodules and nodule candidates that correspond to normal anatomy, according to the present invention;

DESCRIPTION OF THE PREFERRED EMBODIMENTS

Figures 1H, 2A:
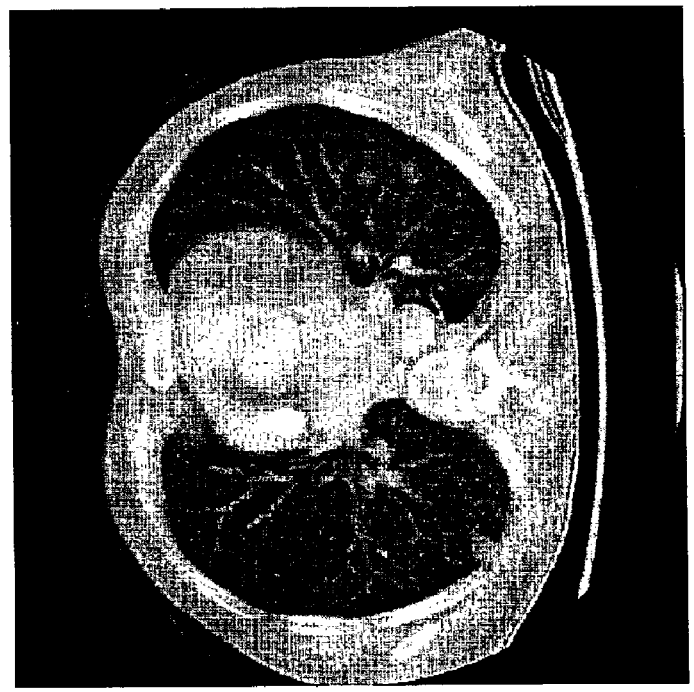

Referring now to the drawings, wherein like reference numerals designate identical or corresponding parts throughout the several views, and more particularly to FIGS. 1(a) and 1(b) thereof, there is illustrated a top-level block diagram of an automated method for the detection of lung nodules in thoracic CT scans according to the present invention, as is further discussed.

The overall scheme according to the present invention will now generally be described with reference to FIGS. 1(a) and 1(b) and will be later described in detail with reference to FIGS. 1(a)–(h), 2(a)–(b), 3, 4(a)–(b), 5(a)–(b), 6, 7(a)–(b), 8(a)–(d), 9–11, 12(a)–(b) and 13–15.

In FIGS. 1(a) and 1(b), the method according to the present invention includes initial acquisition of CT image data (not shown). At step 102, for each section image, a gray-level threshold is applied to create a binary image. A contour-detection algorithm is used to identify the outer margin of the largest "on" region in the binary image, and the set of all image pixels that lie within this contour is considered the segmented thorax region.

At step 104, the trachea and main bronchi are segmented in all sections in which they appear to prevent subsequent inclusion within the segmented lung regions. A gray-level histogram is constructed from the remaining pixels in the segmented thorax region to identify a second gray-level threshold, which is applied to the segmented thorax to create a binary image. The lungs are automatically separated at the anterior junction line when one is present. A contour-detection algorithm is used to identify the outer margins of the largest "on" regions in the binary image, and the set of all image pixels that lie within these contours (excluding pixels identified as the diaphragm) is considered the segmented lung regions. The segmented lung regions are modified by a rolling ball technique to incorporate pixels that may have been erroneously excluded due to initial gray-level thresholding. The rolling ball technique is prevented from incorrectly including pixels that belong to the diaphragm. The segmented lung regions from all sections for a particular CT scan are considered to form a complete segmented lung volume, which forms the basis for subsequent analysis.

At step 106, a multiple gray-level thresholding technique is applied to the segmented lung volume to create a series of thresholded lung volumes. At step 108, an 18-point connectivity scheme is used to identify individual three-dimensional structures within all thresholded lung volumes. At step 110, a volume criterion is used to qualify a structure as a nodule candidate. Feature vectors are computed for all nodule candidates. At steps 112 and 114, the feature vectors then are used as input to an automated classifier (e.g., linear discriminant analysis classifier [19, 20, 35], ANN classifier [17, 18], etc.) to detect nodule candidates that correspond to actual nodules from nodule candidates that correspond to normal anatomy.

A database of 46 helical thoracic CT cases (1,290 individual section images with a total of 300 lung nodules) was used to develop the method according to the present invention and evaluate performance thereof. A detailed description of the automated system, method and computer readable medium for the detection of lung nodules in thoracic CT scans, according to the present invention, will now be provided with reference to FIGS. 1(a)–(h), 2(a)–(b), 3, 4(a)–(b), 5(a)–(b), 6, 7(a)–(b), 8(a)–(d), 9–11, 12(a)–(b) and 13–15.

In the flowcharts of FIGS. 1(a)–(h), after CT section image data is acquired (not shown), at step 102, the thorax is segmented by first constructing a cumulative gray-level profile (step 102a) from values of pixels that lie along a diagonal that extends from a corner of a section image to the image center. The shape of this profile is analyzed (step 102b) to identify a single gray level as a threshold value

[11]. A binary image is created (step 102c) by thresholding the section image such that a pixel is turned "on" in the binary image if a value of the corresponding pixel in the section image has a value greater than the gray-level threshold; all other pixels remain "off" in the binary image. An eight-point contour detection (step 102d) scheme [32] is used to construct a contour surrounding the outermost boundary of the largest "on" region in the binary image (i.e., the thorax). The set of pixels in the section image that lie within this contour defines the segmented thorax region and is used to create a thorax segmentation image (step 102e) such that pixels within the segmented thorax region maintain their original value, while pixels not included within the segmented thorax region are assigned a value of 0. Pixels that represent portions of the examination table that may be included within the segmented thorax region are identified and eliminated. Moreover, the trachea and main bronchi are segmented (step 102f) based on a region-growing technique [32] and eliminated from the segmented thorax region (e.g., as taught in U.S. provisional patent application Attorney Docket Number 0730-0069-20 PROV filed on Jan. 18, 2000).

At step 104, initial lung segmentation begins for a particular section by constructing a gray-level histogram (step 104a) from the pixels that lie within the segmented thorax region [11, 16]. The distribution of pixels in this typically bimodal histogram is used to identify a single gray level (step 104b) as a threshold value within the broad minimum in the histogram [11]. A binary image is created (step 104c) by thresholding the thorax segmentation image such that a pixel is turned "on" in the binary image if the value of the corresponding pixel in the thorax segmentation image has a value less than the gray-level threshold; all other pixels remain "off" in the binary image. The presence of a single "on" region that spans both sides of the resulting binary image indicates that gray-level thresholding has "fused" the two lungs and that an anterior junction line is present in the section image. This anterior junction line is automatically delineated based on the location of a "cleft point" in the binary image and local maximum gray-level information. Pixels along the anterior junction line are turned "off" to ensure the segmentation of two distinct lung regions.

An eight-point contour detection (step 104d) scheme [32] is used to construct contours surrounding the outermost boundaries of the two largest "on" regions in the binary image (i.e., the lungs). The sets of pixels in the section image that lie within these contours define the segmented lung regions and are used to create a lung segmentation image such that pixels within the segmented lung regions maintain their original value, while pixels not included within the segmented lung regions are assigned a value of 0. A rolling ball algorithm [15, 20] is applied (step 104e) to rectify the erroneous exclusion of dense structures such as juxta-pleural nodules and hilar vessels. To prevent pixels that belong to the diaphragm from contributing to the segmented lung regions, diaphragm analysis is performed (step 104f) both on the initial binary images created from gray-level thresholding and in conjunction with the rolling ball technique (e.g., as taught in U.S. provisional patent application Attorney Docket Number 0730-0069-20 PROV filed on Jan. 18, 2000).

Figure 3:
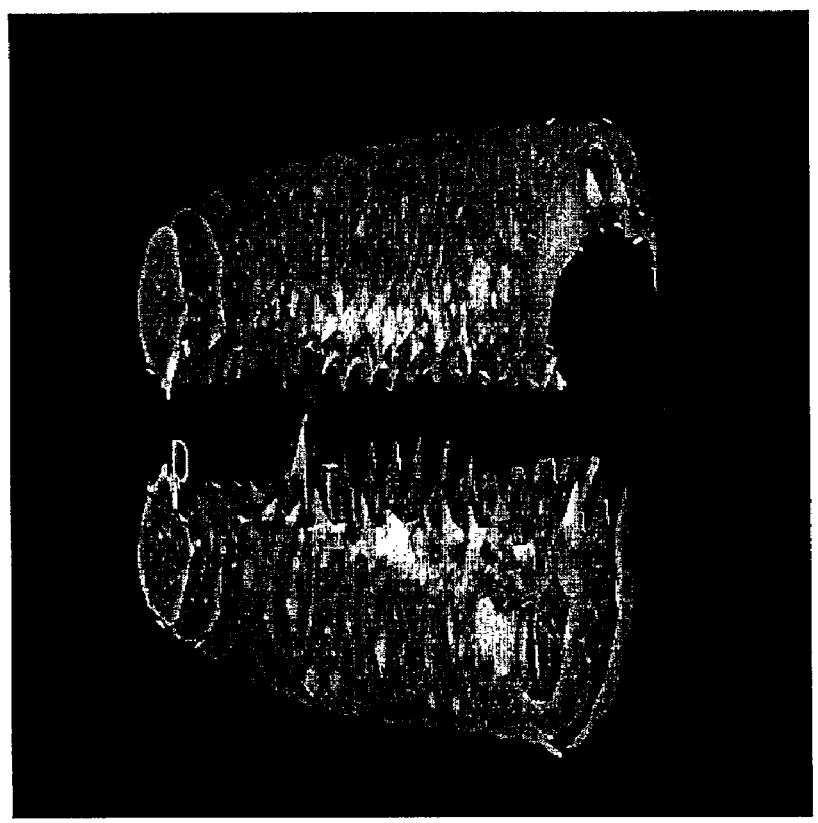
FIG. 3 is an image illustrating a segmented lung volume resulting from a set of segmented lung regions from all sections of the lungs, according to the present invention.
Figure 2B:
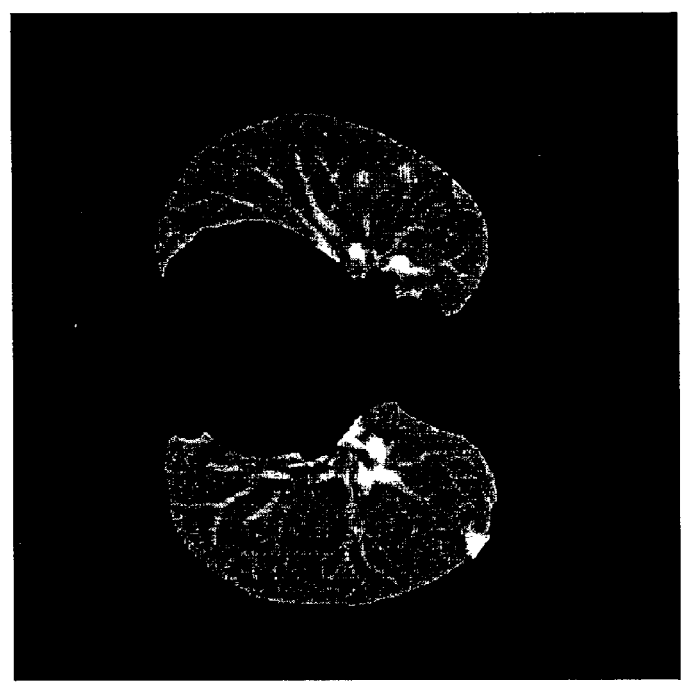

FIGS. 2(a) and 2(b) are images illustrating (a) an original section image and (b) corresponding segmented lung regions that are automatically extracted from the original section image, as described above. The segmented lung regions from all sections for a particular CT scan are considered to form a complete segmented lung volume as shown in FIG. 3; subsequent analysis is confined to this volume.

At step 106, the segmented lung regions are modified using multiple-gray level thresholding prior to forming the segmented lung volume to eliminate bright bands that tend to exist along the periphery of the segmented lung regions; the presence of these bands confounds the 18-point connectivity scheme later applied to the thresholded lung volumes. A band is identified based on gray-level profiles along lines normal to the periphery of the segmented lung regions. A matched filter is placed along each band and directional gradient information obtained along each band is used to ensure that juxta-pleural nodules are not eliminated when the band is removed from the segmented lung regions.

At each of 36 equally spaced gray-level thresholds (step 106a) that range in value from 50 to 225, a thresholded lung volume is created (step 106b) based on the segmented lung volume [20]. A pixel in the lung regions of each CT section is turned "off" if its gray level is less than the current gray-level threshold; the values of pixels with gray levels greater than the threshold remain unchanged.

Figure 4B:
FIGS. 4(a) and 4(b) are images illustrating segmented lung regions from the image of FIG. 2(b) thresholded (a) at a gray level of 90 and (b) at a gray level of 150, according to the present invention, wherein fewer pixels remain "on" at the higher threshold.
Figure 4A:
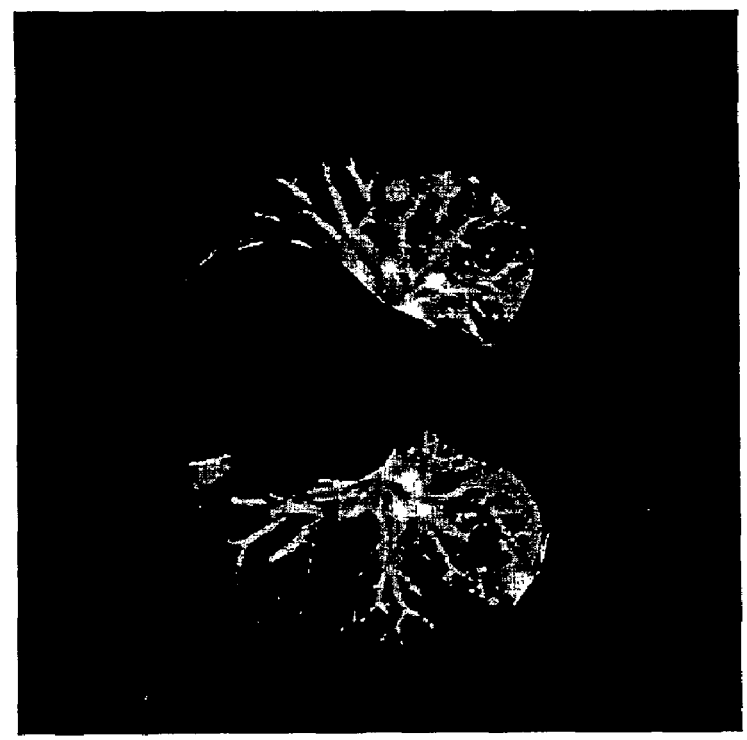
Figure 5B:
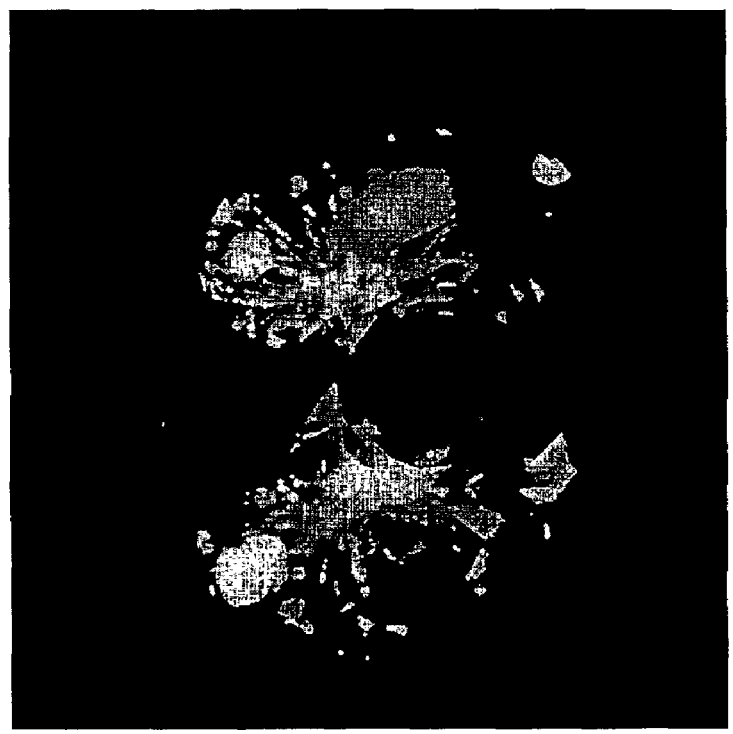
FIGS. 5(a) and 5(b) are maximum intensity projection images illustrating a complete segmented lung volume thresholded with gray-level thresholds of (a) 90 and (b) 150, according to the present invention.
Figure 5A:
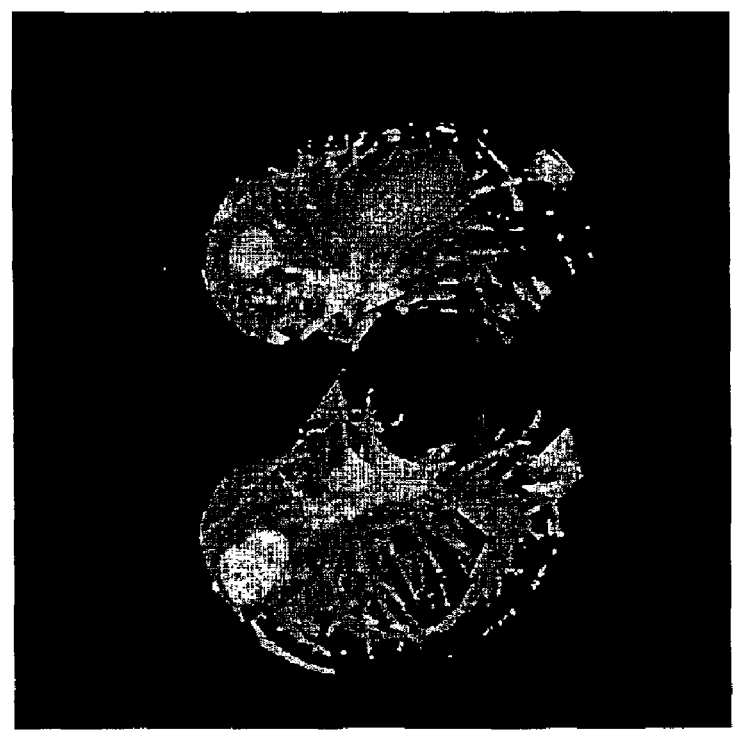

The segmented lung regions from FIG. 2(b), thresholded at a gray level of 90 and 150, are respectively shown in FIGS. 4(a) and 4(b). From these figures, it is apparent that fewer pixels remain "on" at the higher threshold as shown in FIG. 4(b). Maximum intensity projection images illustrating a complete segmented lung volume, thresholded with gray-level thresholds of 90 and 150, are respectively shown in FIGS. 5(a) and 5(b). As is apparent from FIGS. 4 and 5, as the gray-level threshold increases, the number of remaining pixels in the lung regions of any one section decreases, and the number of remaining pixels in the corresponding thresholded lung volume decreases.

Figure 6:
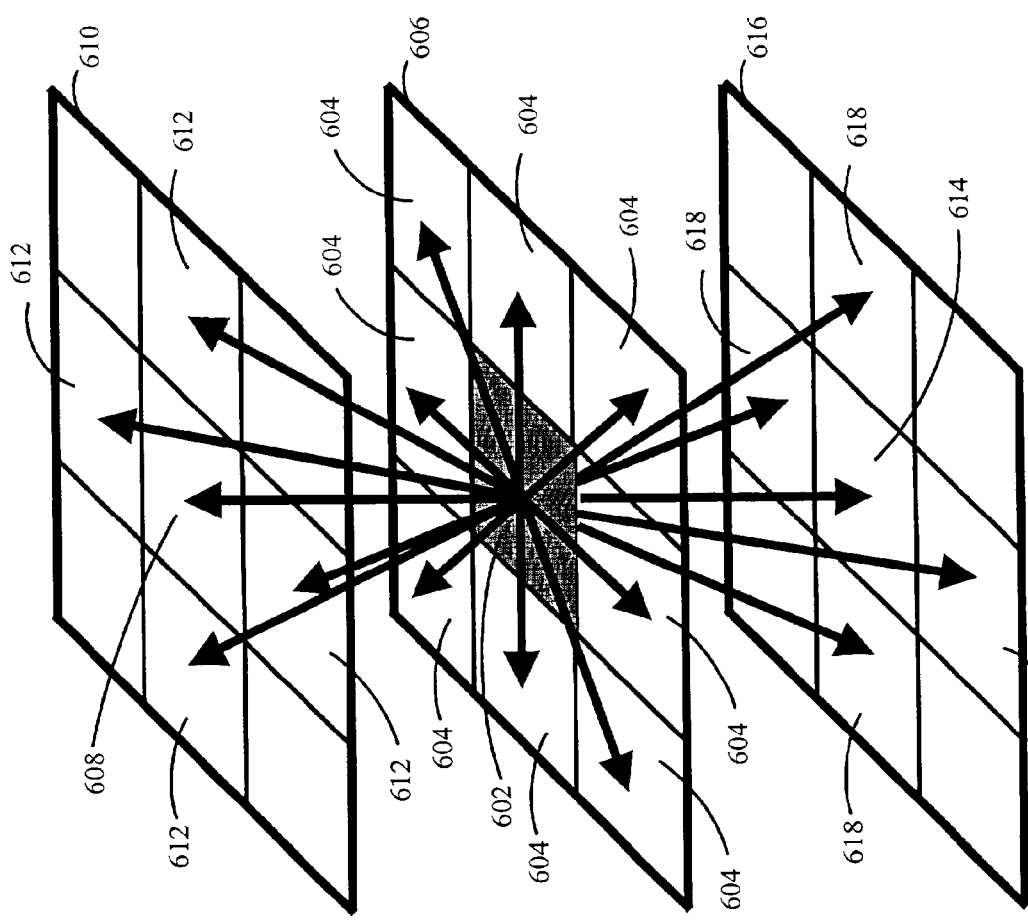
FIG. 6 is a diagram illustrating an 18-point connectivity scheme that connects contiguous groups of "on" pixels in three dimensions, according to the present invention, wherein the "on" pixel of interest (gray) is grouped with any of its 18 neighboring points (indicated by arrows) that are also "on" and the 18-point connectivity scheme is performed for all "on" pixels in any of thresholded lung volumes.

At step 108, at each threshold level, all pixels that remain "on" are grouped together through a three-dimensional 18-point connectivity scheme (step 108a). In this scheme, as shown in FIG. 6, an "on" pixel (i.e., a "pixel of interest") 602 within a thresholded lung volume is grouped with all "on" pixels that exist within an 18-pixel neighborhood composed of (1) eight pixels 604 that border the pixel of interest 602 in a present section 606, (2) a pixel 608 spatially corresponding to the pixel of interest 602 in the section 610 immediately above the present section 606 along with its four nearest neighbors 612, and (3) a pixel 614 spatially corresponding to the pixel of interest 602 in the section 616 immediately below the present section 606 along with its four nearest neighbors 618. "Grouped" in the context of the present invention means that pixels are identified as belonging to the same three-dimensional structure. The above method is applied to all "on" pixels in each thresholded lung volume. In this manner, individual structures within all 36 thresholded volumes are identified.

At step 110, the geometric volume of each of the individual structure is computed (step 110a) by multiplying the number of pixels contained within the structure by the known voxel (i.e., a unit of graphic information that defines an element of volume in three-dimensional space) dimensions. Structures with volume less than that of a sphere with a diameter of, for example, 3 cm (i.e., a volume of 14.1 cm$^3$) are included in a set of nodule candidates 110b). The basis for this upper volume bound is the generally accepted maximum size of pathology that may be referred to radiographically as a "nodule" [33].

Figure 7A:
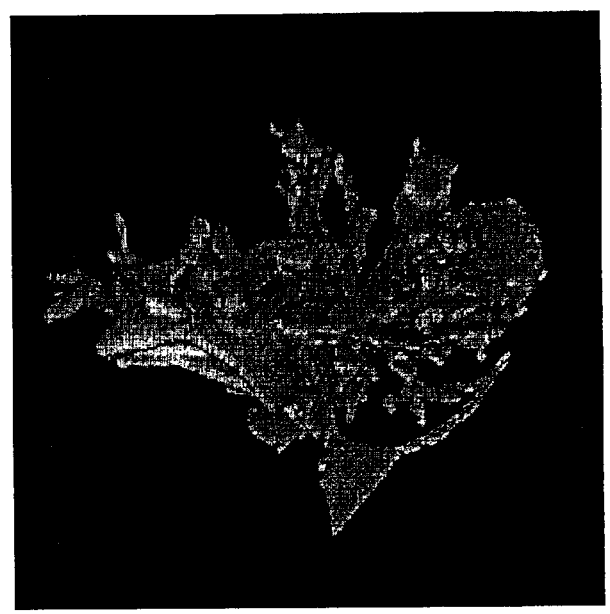

Volume rendering of a single three-dimensional structure identified by the 18-point connectivity scheme applied to a segmented lung volume created at the low gray-level threshold (e.g., 90), is shown in FIG. 7(a), wherein a large volume of this structure fails to meet volume criterion. In FIG. 7(b), with the segmented lung volume created at the higher gray-level threshold (e.g., 150), the same structure dissociates into multiple smaller structures, many of which satisfy the volume criterion and will be included in the set of nodule candidates. As is apparent from FIG. 7, at a low gray-level threshold, the structures identified through 18-point connectivity within the corresponding thresholded lung volume tend to be large, while at higher gray-level thresholds, however, the same structures dissociate into multiple smaller structures within the corresponding thresholded lung volume with many of these smaller structures qualifying as nodule candidates.

A region-erosion technique is applied to individual structures (step 110c) after they initially satisfy the volume criterion. Region-erosion determines whether a structure is composed of two or more smaller structures. Once the volume of a structure decreases below an upper limit, subsequent gray-level thresholds are applied to pixels of that structure only. The volume of the eroded structure is computed as the threshold is incremented by one gray level. If the "structure" actually consists of a single structure, then the volume decreases smoothly as the gray-level threshold is incremented. However, if the decrease in volume is not smooth, either: (1) the original "structure" was connected to pixels that did not belong to the main structure and the region-erosion technique has yielded a more accurate segmentation of the original structure, or (2) the original "structure" was actually composed of two structures, both of which are then designated nodule candidates. In either case, region-erosion provides a more accurate set of nodule candidates.

A Hough transform has been extended from two dimensions into three dimensions to identify and eliminate elongated, ellipsoidal nodule candidates (step 110d) that have a high likelihood of corresponding to normal anatomy (e.g., as taught in [32] and U.S. provisional patent application No. 60/160,790). An additional technique for separating actual nodules from non-nodules is preprocessing the image data with a radial-gradient index [34]. This preprocessing can be performed in either 2D or 3D (step 110d). In 2D, at each point in a 2D section, contours are obtained for various gray-level increments. That is, each pixel location in a section is looked at as the center of a potential nodule. Around each contour the radial gradient index is calculated. The radial gradient RGI is given by:

$$RGI = \left( \sum_{(x,y) \in M} \|\hat{G}(x,y)\| \right)^{-1} \sum_{(x,y) \in M} \hat{G}(x,y) \frac{\hat{r}(x,y)}{\|\hat{r}(x,y)\|}$$

where $\hat{G}(x, y)$ is the gradient vector of $f(x, y)$ at position $(x, y)$ along the margin defined by the contour and $\hat{r}(x,y)/\|\hat{r}(x,y)\|$ is the normalized radial vector at the position $(x, y)$. Note that with CT data typically no constraint function is needed prior to generating the contours. The contour with the largest radial gradient index corresponds then to a segmented lesion candidate. Those candidates with a radial gradient index less than a given cutoff (e.g., 0.75) are eliminated. In three dimensions, the contours are replaced by surfaces (i.e., at specific gray-level increments, a surface is formed and the radial gradient index is calculated). Those candidates with a 3D radial gradient index less than some cutoff value (e.g., 0.50) are then eliminated from further analysis. Note that the 3D radial gradient analysis can be modified to compensate for section thickness, which accommodates the anisotropic nature of CT data. In that case, one can model a cylinder instead of a sphere into the radial gradient calculation as shown in FIG. 8.

FIGS. 8(a), 8(b), 8(c) and 8(d) are diagrams illustrating how structures of different shape affect the radial gradient and depict the appropriate model for use with anisotropic image data. A circular structure such as a nodule depicted in FIG. 8(a) in two dimensions will yield a larger radial gradient index value than a linear structure such as a vessel depicted in FIG. 8(b). For purposes of computing the three-dimensional radial gradient index, a nodule may be modeled as a sphere when voxels are dimensionally isotropic as shown in FIG. 8(c). However, since actual CT image data is acquired from anisotropic voxels, nodules must typically be modeled as cylindrical structures as shown in FIG. 8(d).

A similarity index is used (step 110e) to compute, for example, the size of a nodule candidate relative to the distribution of sizes for neighboring candidates. The notion is that, at a given distance from the hilum, the characteristics of nodules will be distinctly different from the corresponding characteristics of neighboring vessels. These techniques are implemented to enhance sensitivity and reduce the number of nodule candidates prior to the feature-vector computation later described.

FIG. 9 is a diagram illustrating zones that are defined within a lung segmentation region for computation of the similarity index. A lung segmentation contour 902 (i.e., the outermost contour) has three spatial zones or neighborhoods 904, 906 and 908 identified therein. Relative values of features of structures (e.g., relative effective diameter, relative effective area, relative effective circularity, relative effective compactness, etc.) within the individual zones 904, 906 and 908 are used to discriminate between nodules and normal anatomy. Such neighborhoods 904, 906 and 908 could be overlapping. In addition, the similarity index can be also combined with knowledge of a distance of a nodule candidate from the hilum.

A flowchart depicting the integration of the above techniques is shown in FIG. 10. In FIG. 10, integration of a radial gradient index and a similarity index in two or three dimensions for identification of initial nodule candidates is achieved. At step 1002, the radial gradient index and the similarity index are computed. At step 1004, the appropriate thresholds are applied. At step 1006, feature values are computed within given image zones. At step 1008, initial nodule candidates are identified within the image zones. Nine features typically are computed for each nodule candidate (step 110f). These features include, for example, six geometric features (e.g., structure volume, sphericity, the radius of the equivalent sphere, maximum compactness, maximum circularity, and maximum eccentricity) and three gray-level features (e.g., mean gray level within the structure, standard deviation of the gray level, and the gray-level threshold at which the structure volume first decreases below the upper volume bound). Maximum compactness, maximum circularity, and maximum eccentricity are the maximum values of the respective two-dimensional features computed for all sections in which a particular structure exists. The three-dimensional sphericity feature (i.e., defined as a fraction of a volume of a structure that is contained within an equivalent-volume sphere centered at a structure's center-of-mass) is illustrated in FIG. 11.

Figure 12B:
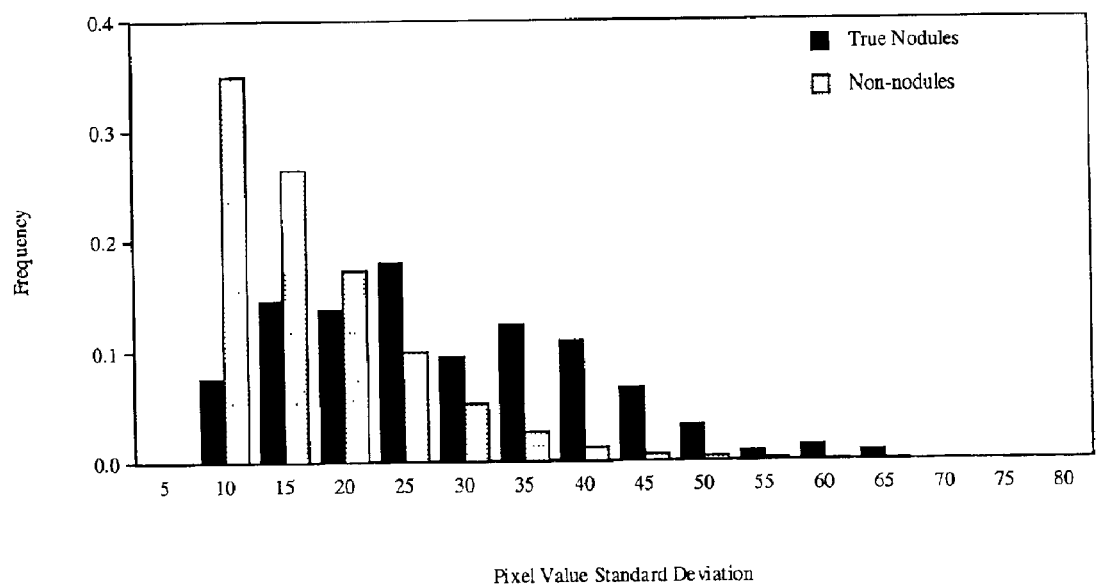

The distributions of two of the above features are shown in the graphs of FIG. 12. FIG. 12(a) is graph illustrating a distribution of the sphericity feature values for nodule candidates that correspond to true nodules and nodule candidates that correspond to normal anatomy. FIG. 12(b) is graph illustrating a distribution of the pixel value standard deviation feature values for nodule candidates that correspond to true nodules and nodule candidates that correspond to normal anatomy. Based on the distributions of these features, a rule-based metric (e.g., as taught in [13] and U.S. Pat. Nos. 5,463,548; 5,622,171; 5,732,697; and 5,873,824; and patent application Ser. Nos. 08/562,087; 08/900,361; and 09/027,685) is imposed (step 110g) to eliminate a large fraction of nodule candidates that correspond to normal anatomy (i.e., false-positive detections). At step 112, the values of the above features for the remaining nodule candidates are analyzed (step 112a), for example, by an automated linear classifier [19, 20, 35], ANN classifier (e.g., as taught in [17, 18] and U.S. Pat. Nos. 5,463,548; 5,622, 171; 5,732,697; and 5,873,824; and patent application Ser. Nos. 08/562,087; 08/900,361; and 09/027,685), etc., reducing the number of nodule candidates deemed detected at step 114.

Figure 13:
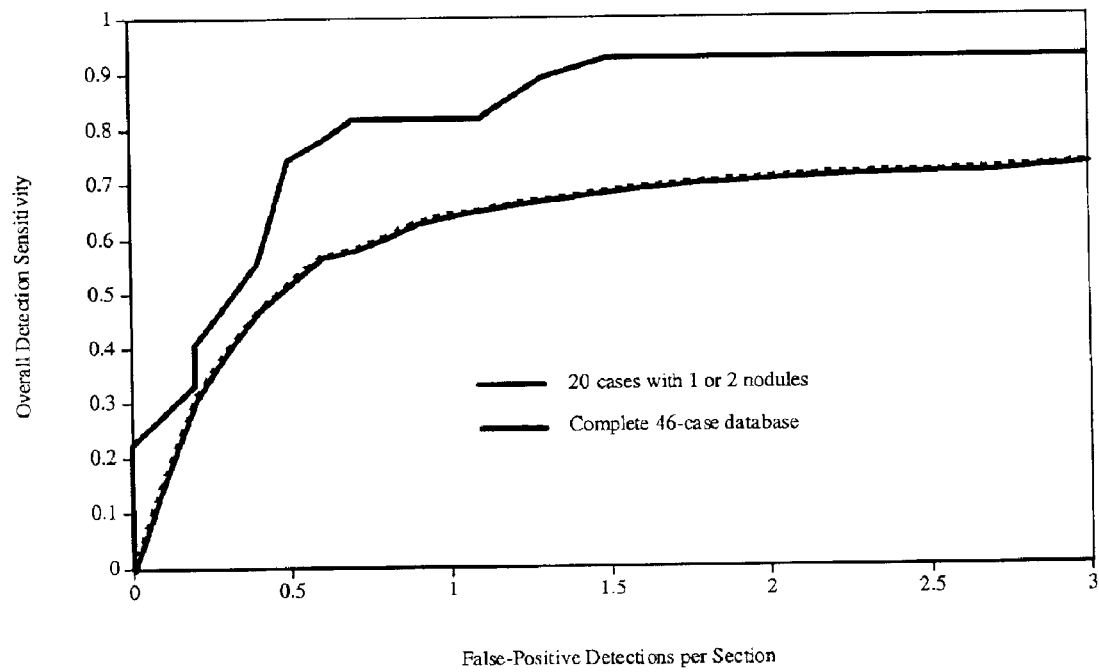
FIG. 13 is a graph illustrating FROC curves demonstrating overall nodule detection performance (i.e., detection sensitivity as a function of a number of false-positive detections per section) of the automated method according to the present invention, for a complete 46-case database (300 nodules) and on a subset of cases (i.e., 20) with only one or two nodules.

FIG. 13 presents the free-response receiver operating characteristic curve (FROC) [36] for overall nodule detection performance for a 46-case database based on a combination of methods described previously. Cases in the 46-case database contain from 1–54 nodules. The patients who potentially will most benefit from automated nodule detection, however, are those with primary lung cancer, while patients with a large number of nodules most likely have metastatic disease. Therefore, FIG. 13 presents the FROC curve for overall nodule detection performance on the subset of cases (i.e., 20 cases) that contain at most two nodules, with the notion that performance on these 20 cases represents a more accurate assessment of potential clinical significance. As shown by FIG. 13, an overall nodule detection sensitivity of 89% with an average of 1.2 false-positive detections per section for those 20 cases with at most two nodules has been obtained, while an overall nodule detection sensitivity of 69% with an average of 1.6 false-positive detections per section for the complete 46-case database has been obtained.

The present invention provides an improved method for the automated detection of lung nodules in helical thoracic CT scans. The method uses gray-level thresholding techniques to segment the lung volume within the image data. Multiple gray-level thresholds are then applied in conjunction with a volume criterion to identify a set of three-dimensional nodule candidates. The number of candidates that correspond to non-nodule structures is reduced using, for example, linear discriminant analysis as an automated classifier. This method demonstrates promising performance in its ability to accurately detect lung nodules in CT scans.

Figure 14:
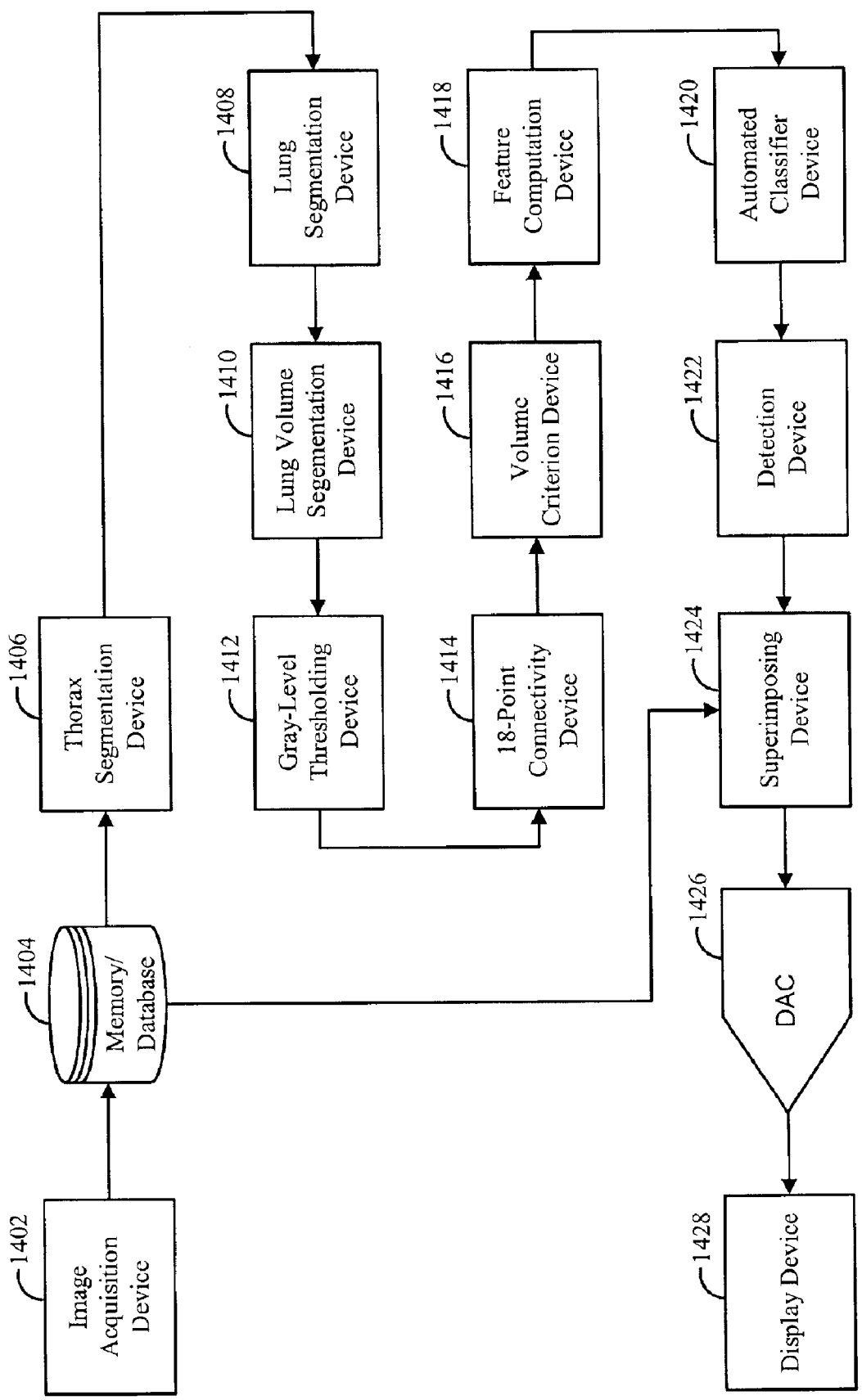
FIG. 14 is a block diagram illustrating a system for implementing the method for the automated detection of lung nodules in thoracic CT scans, according to the present invention.

FIG. 14 is a block diagram of a system for implementing the above-note processes according to the present invention. With the system, CT scans of an object are obtained from an image acquisition device 1402 for processing by the system. Each image is put into memory or a database 1404. The image data of each section image from a particular CT scan is first passed through a thorax segmentation device 1406 and then through a lung segmentation device 1408. The output from the lung segmentation device 1408 for all section images in a particular CT scan is combined in the lung-volume-segmentation device 1410. The segmented lung volume data is repeatedly passed through a gray-level-thresholding device 1412 to create a series of thresholded lung volumes, each of which is then passed through an 18-point-connectivity device 1414 and then through a volume criterion device 1416. The output from this sequence of devices is a set of nodule candidates, which are then passed through a feature computation device 1418. The output from the feature computation device 1418 is sent to an automated classifier device 1420 (e.g., linear discriminant analysis classifier [19, 20, 35], ANN classifier [17, 18], etc.), the results of which are sent to a detection device 1422. In a superimposing device 1424, the results are either superimposed onto images, stored in file format, or given in text format. The results are then displayed on the display device 1428 after passing through a digital-to-analog converter (DAC) 1426.

Figure 15:
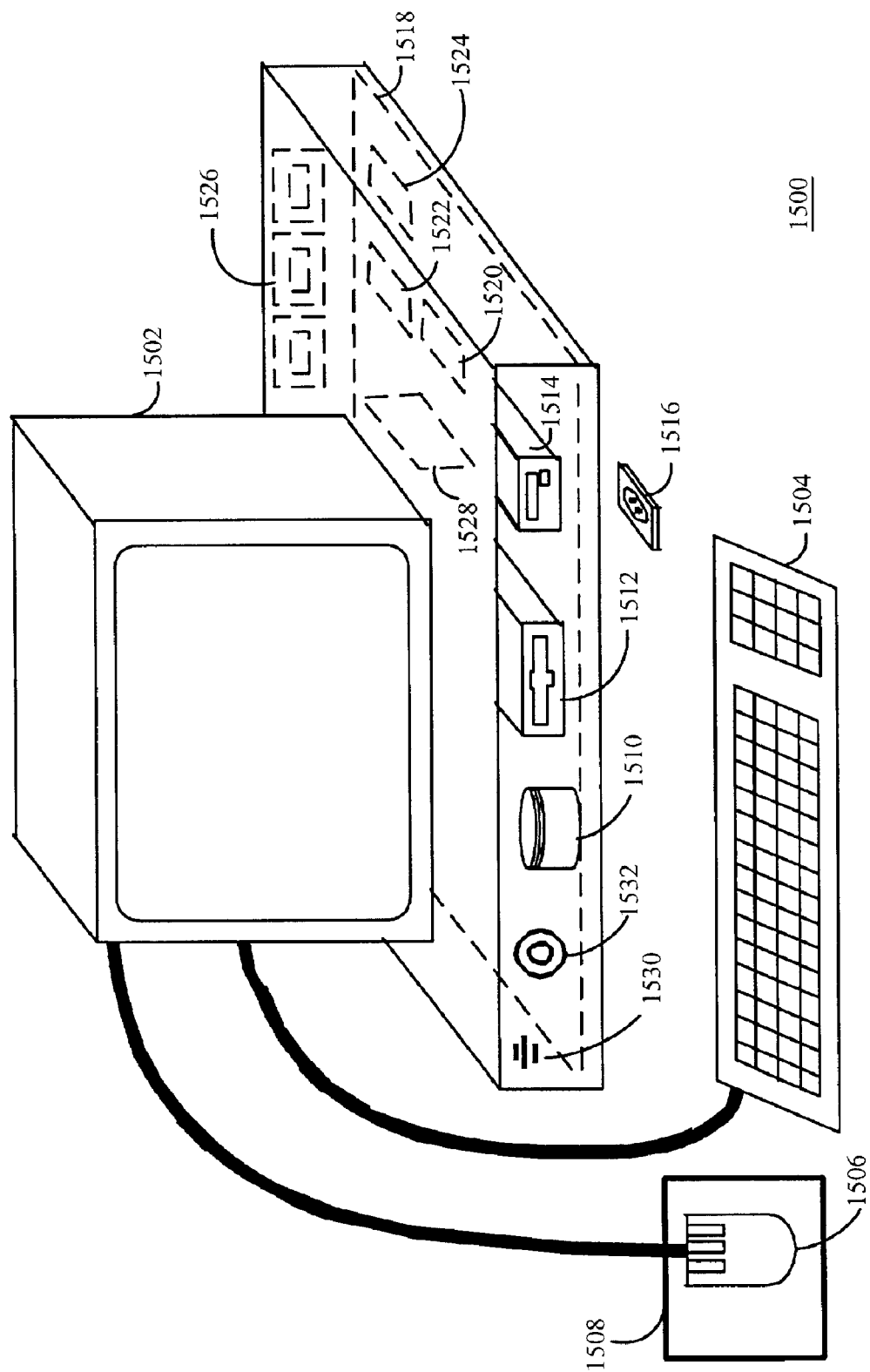
FIG. 15 is a schematic illustration of a general purpose computer which can be programmed according to the teachings of the present invention.

FIG. 15 is a schematic illustration of a general purpose computer 1500 which can be programmed according to the teachings of the present invention. In FIG. 15, the computer 1500 implements the processes of the present invention, wherein the computer includes, for example, a display device 1502 (e.g., a touch screen monitor with a touch-screen interface, etc.) for implementing the display device 1428 of FIG. 14, a keyboard 1504, a pointing device 1506, a mouse pad or digitizing pad 1508, a hard disk 1510, or other fixed, high density media drives, connected using an appropriate device bus (e.g., a SCSI bus, an Enhanced IDE bus, an Ultra DMA bus, a PCI bus, etc.) for implementing the memory or database device 1404 of FIG. 14, a floppy drive 1512, a tape or CD ROM drive 1514 with tape or CD media 1516, or other removable media devices, such as magneto-optical media, etc., and a mother board 1518. The mother board 1518 includes, for example, a processor 1520, a RAM 1522, and a ROM 1524 (e.g., DRAM, ROM, EPROM, EEPROM, SRAM, SDRAM, and Flash RAM, etc.) for implementing devices 1404–1424 of FIG. 14, I/O ports 1526 which may be used to couple to an image acquisition device (e.g., image acquisition device 1402 of FIG. 14) and optional special purpose logic devices (e.g., ASICs, etc.) or configurable logic devices (e.g., GAL and re-programmable FPGA) 1528 for performing specialized hardware/software functions, such as sound processing, image processing, signal processing, neural network processing, automated classification, etc., and for implementing device 1426 of FIG. 14, a microphone 1530, and a speaker or speakers 1532.

As stated above, the system includes at least one computer readable medium. Examples of computer readable media are compact discs, hard disks, floppy disks, tape, magneto-optical disks, PROMs (EPROM, EEPROM, Flash EPROM), DRAM, SRAM, SDRAM, etc. Stored on any one or on a combination of computer readable media, the present invention includes software for controlling both the hardware of the computer 1500 and for enabling the computer 1500 to interact with a human user. Such software may include, but is not limited to, device drivers, operating systems and user applications, such as development tools. Such computer readable media further includes the computer program product of the present invention for performing any of the processes according to the present invention, described above (see, e.g., FIGS. 1, 6, 8, 9, 10 and 14). The computer code devices of the present invention can be any interpreted or executable code mechanism, including but not limited to scripts, interpreters, dynamic link libraries, Java classes, and complete executable programs, etc.

The programming of general purpose computer 1500 may include a software module for digitizing and storing images obtained from an image acquisition device (e.g., image acquisition device 1402 of FIG. 14). Alternatively, the present invention can also be implemented to process digital data derived from images obtained by other means, such as a picture archive communication system (PACS). In other words, often the digital images being processed will be in existence in digital form and need not be converted to digital form in practicing the invention.

Accordingly, the mechanisms and processes set forth in the present description may be implemented using a conventional general purpose microprocessor or computer programmed according to the teachings in the present specification, as will be appreciated by those skilled in the relevant art(s). Appropriate software coding can readily be prepared by skilled programmers based on the teachings of the present disclosure, as will also be apparent to those skilled in the relevant art(s). However, as will be readily apparent to those skilled in the art, the present invention also may be implemented by the preparation of application-specific integrated circuits or by interconnecting an appropriate network of conventional component circuits.

The present invention thus also includes a computer-based product which may be hosted on a storage medium and include instructions which can be used to program a general purpose microprocessor or computer to perform processes in accordance with the present invention. This storage medium can include, but is not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

Recapitulating, the image processing aspects of the present invention provides an improved computerized, automated method for lung nodule detection in thoracic CT scans (e.g., acquired with either a standard helical protocol or a low-dose helical protocol) based on multiple gray-level thresholding, region-erosion, and feature extraction techniques. For each section image, a gray-level threshold is applied to create a binary image. A contour-detection algorithm identifies the outer margin of the largest "on" region in the binary image, and the set of all image pixels that lie within this contour defines the segmented thorax region. The trachea and main bronchi are segmented to prevent subsequent inclusion within the segmented lung regions. A gray-level histogram is constructed from the pixels in the segmented thorax region to identify a second gray-level threshold, which is applied to the segmented thorax to create a binary image. The lungs are automatically separated at the anterior junction line when one is present. A contour-detection algorithm identifies the outer margins of the largest "on" regions in the binary image, and the set of all image pixels that lie within these contours (excluding pixels identified as diaphragm) defines the segmented lung regions. The segmented lung regions are modified by a rolling ball technique to incorporate pixels that may have been erroneously excluded by gray-level thresholding. The rolling ball technique is prevented from incorrectly including pixels that belong to the diaphragm. The segmented lung regions from all sections for a particular CT scan form a segmented lung volume, which forms the basis for subsequent analysis. A multiple gray-level thresholding technique is applied to the segmented lung volume to create a series of thresholded lung volumes. An 18-point connectivity scheme is used to identify individual three-dimensional structures within all thresholded lung volumes. A volume criterion is used to qualify a structure as a nodule candidate. Feature vectors are computed for all nodule candidates. These feature vectors are used as input to an automated classifier to distinguish nodule candidates that correspond to actual nodules from nodule candidates that correspond to normal anatomy.

Novel developments and implementations of the present invention include techniques for region erosion to isolate lung nodules from normal pulmonary anatomy, use of a similarity index to initially identify lung nodules, and convolution of image data with three-dimensional filters to improve detection performance. Accordingly, the techniques of the present invention have the potential to assist radiologists in the automated detection of lesions in helical computed tomography (CT) scans of the thorax.

Although the present invention is described in terms of extracting features, such as structure volume, sphericity, the radius of the equivalent sphere, maximum compactness, maximum circularity, maximum eccentricity, mean gray level within the structure, standard deviation of the gray level, the gray-level threshold at which the structure volume first decreases below the upper volume bound, etc., to reduce false-positives, other features, such as effective diameter, degrees of circularity and irregularity, slopes of the effective diameter and degrees of circularity and irregularity, average gradient, standard deviation of gradient orientation, contrast and net contrast (e.g., as taught in patent application Ser. No. 08/562,087) could be extracted, as will be appreciated by those skilled in the relevant art(s).

Obviously, numerous modifications and variations of the present invention are possible in light of the above teachings. It is therefore to be understood that within the scope of the appended claims, the invention may be practiced otherwise than as specifically described herein.

LIST OF REFERENCES

[1]. Landis S H, Murray T, Bolden S, Wingo P A, "Cancer statistics, 1999, " CA: *A Cancer Journal for Clinicians* 49:8–31, 1999.

[2]. Heelan R T, Flehinger B J, Melanmed M R, et al., "Non-small-cell lung cancer: Results of the New York screening program," *Radiology* 151:289–293, 1984.

[3]. Sone S, Takashima S, Li F, et al., "Mass screening for lung cancer with mobile spiral computed tomography scanner, " *The Lancet* 351:1242 1245, 1998.

[4]. Naidich D P, Zerhouni E A, Siegelman S S, "Computed Tomography of the Thorax, " New York, N.Y.: Raven Press; 1984.

[5]. Webb W R, "Advances in computed tomography of the thrax, " *Radiologic Clinic of North America* 21:723 739, 1983.

[6]. Pagatch R D, Faling L J, "Computed tomography of the thorax: A status report, " *Chest* 80:618 626. 1981.

[7]. Muhm J R, Brown L R, Crowe J K, "Detection of pulmonary nodules by computed tomography," *American Journal of Roentgenology* 128:267 270, 1977.

[8]. Gurney J W, "Missed lung cancer at CT: Imaging findings in nine patients," *Radiology* 199:117 122, 1996.

[9]. Croisille P, Souto M, Cova M, et al., "Pulmonary nodules: Improved detection with vascular segmentation and extraction with spiral CT," *Radiology* 197:397 401, 1995.

[10]. White C S , Romney B M, Mason A C, et al., "Primary carcinoma of the lung overlooked at CT: Analysis of findings in 14 patients," *Radiology* 199:109 115, 1996.

[11]. Giger M L, Bae K T, MacMahon H, "Computerized detection of pulmonary nodules in computed tomography images," *Investigative Radiology* 29:459 465, 1994.

[12]. Ryan W J, Reed J E, Swensen S J, Sheedy P F, Jr., "Automatic detection of pulmonary nodules in CT," In: H. U. Lemke, M. W. Vannier, K. Inamura, and A. G. Farman, eds., *Proceedings Computer Assisted Radiology,* Amsterdam: Elsevier Science; 1996:385 389.

[13]. Kanazawa K, Kubo M, Niki N, et al., "Computer assisted lung cancer diagnosis based on helical images," In: R. T. Chin, H. H. S. Ip, A. C. Naiman, and T.-C. Pong, eds., *Image Analysis Applications and Computer Graphics: Proceedings of the Third International Computer Science Conference,* Berlin: Springer-Verlag; 1995:323 330.

[14]. Okumura T, Miwa T, Kako J, et al., "Image processing for computer-aided diagnosis of lung cancer screening system by CT (LSCT)," *SPIE Proceedings* 3338:1314 1322, 1998.

[15]. Armato S G, III, Giger M L, Moran C J, et al., "Automated detection of pulmonary nodules in helical computed tomography images of the thorax, " *SPIE Proceedings* 3338:916 919, 1998.

[16]. Armato S G, III, Giger M L, Moran C J, et al., "Computerized detection of lung nodules in computed tomography scans," In: K. Doi, H. MacMahon, M. L. Giger, and K. R. Hoffmann, eds., *Computer-Aided Diagnosis in Medical Images,* Amsterdam: Elsevier Science; 1999:119 123.

[17]. Pao Y-H, "Adaptive Pattern Recognition and Neural Networks," Reading, Mass: Addison-Wesley Publishing Company; 1898.

[18]. Metz C E, "ROC methodology in radiologic imaging," *Investigative Radiology* 21:720 733, 1989.

[19]. Armato S G, III, Giger M L, Moran C J, et al., "Computerized detection of pulmonary nodules on CT scans," *RadioGraphics* 19:1303 1311, 1999.

[20]. Armato S G, III, Giger M L, Blackburn J T, et al., "Three-diminsional approach to lung nodule detection in helical CT," *SPIE Proceedings* 3661:553 559, 1999.

[21]. Fiebich M, Wietholt C, Renger B C, et al., "Automatic detection of pulmonary nodules in low-dose screening thoracic CT examinations," *SPIE Proceedings* 3661:1434 1439, 1999.

[22]. Satoh H, Ukai Y, Niki N, et al., "Computer aided diagnosis system for lung cancer based on retrospective helical CT image," *SPIE Proceedings* 3661:1324 1335, 1999.

[23]. Taguchi H, Kawata Y, Niki N, et al., "Lung caner detection based on helical CT images using curved surface morphology analysis," *SPIE Proceedings* 3661:1307 1314, 1999.

[24]. Lou S-L, Chang C-L, Lin K-P, Chen T-S, "Object-based deformation technique for 3-D CT lung nodule detection," *SPIE Proceedings* 3661:1554 1552, 1999.

[25]. Kalender W A, Seissler W, Klotz E, Vock P, "spiral volumetric CT with single-breath-hold techique, continuous transport, and continuous scanner rotation," *Radiology* 176:181 183, 1990.

[26]. Vannier M W, Wang G, "Principles of spiral CT," In: M. Remy-Jardin and J. Remy, eds., *Spiral CT of the Chest,* Berlin: Springer; 1996:1 32.

[27]. Remy-Jardin M, Remy J, Giraud F, Marquette C-H, "Pulmonary nodules: Detection with thick-section spiral CT versus conventional CT," *Radiology* 187:513 520, 1993.

[28]. Kaneko M, Eguchi K, Ohmatsu H, et al., "Peripheral lung Cancer: Screening and detection with low-dose spiral CT versus radiography," *Radiology* 201:798 802, 1996.

[29]. Rusinek H, Naidich D P, McGuinness G, et al., "Pulmonary nodule detection Low-dose versus conventional CT," *Radiology* 209:243 249, 1998.

[30]. Diederich S, Lenzen H, Windmann R, et al., "Pulmonary nodules: Experimental and clinical studies at low-dose CT," *Radiology* 23:289 298, 1999.

[31]. Henschke C I, McCauley D I, Yankelevitz D F, et al., "Early Lung Cancer Action Project: Overall design and findings from baseline screening," *The Lancet* 354:99 105, 1999.

[32]. Sonka M, Hlavac V, Boyle R, "Image Proceeding, Analysis, and Machine Vision" Pacific Grove, Calif.: Brooks/Cole Publishing Company; 1999.

[33]. Tuddenham W J, "Glossary of terms for thoracic radiology: Recommendations of the Nomenclature Committee of the Fleischner Society," *American Journal of Roentgenology* 143:509 517, 1984.

[34]. Kupinski M A, Giger M L, "Automated seeded lesion segmentation on digital mammograms," *IEEE Transactions on Medical Imaging* 17:510 517, 1998.

[35]. Johnson R A, Wichern D W, "Applied Multivariate Statistical Analysis," Englewood Cliffs, N.J.: *Prentice Hall;* 1992.

[36]. Bunch P C, Hamilton J F, Sanderson G K, Simmons A H, "A free response approach to the measurement and characterization of radiographic observer performance," *SPIE Processdings* 127:124 135, 1977.

What is claimed as new and desired to be secured by Letters Patent of the United States is:

1. A method for automated detection of lung nodules in computed tomography (CT) image scans, comprising:

generating two-dimensional segmented lung images by segmenting a plurality of two-dimensional CT image sections derived from said CT image scans;

generating three-dimensional segmented lung volume images by combining said two-dimensional segmented lung images;

determining three-dimensional lung nodule candidates from said three-dimensional segmented lung volume images, including, identifying structures within said three-dimensional segmented lung volume images that meet a volume criterion;

deriving features from said lung nodule candidates; and detecting lung nodules by analyzing said features to eliminate false-positive nodule candidates from said nodule candidates.

2. The method of claim 1, wherein said step of generating said segmented lung images comprises the steps of:

generating two-dimensional segmented thorax images by segmenting said plurality of two-dimensional CT image sections, including, applying gray-level thresholds to said CT image sections to determine thorax region contours therein; and generating said two-dimensional segmented lung images by segmenting said segmented thorax images, including, applying gray-level thresholds to said segmented thorax images to determine said lung region contours therein.

3. The method of claim 2, wherein said step of generating said segmented thorax images further comprises:

segmenting the trachea and main bronchi from said segmented thorax images using region growing.

4. The method of claim 2, wherein said step of generating said segmented lung images further comprises:

segmenting the diaphragm from said segmented lung images using diaphragm analysis.

5. The method of claim 1, wherein said step of generating said segmented lung volume images comprises:

generating said segmented lung images at a plurality of gray levels thresholds; and combining said segmented lung images to generate segmented lung volume images at a plurality of gray levels corresponding to said grey level thresholds.

6. The method of claim 5, wherein said step of identifying said structures comprises:

grouping a pixel from a given segmented lung image with one or more pixels therein, one or more pixels from a segmented lung image above said given segmented lung image and one or more pixels from a segmented lung image below said given segmented lung image to determine a structure;

performing said step of grouping at said plurality of grey level thresholds;

computing a volume of all determined structures at said plurality of grey level thresholds; and determining said nodule candidates by comparing computed volumes of said determined structures at said plurality of gray levels with said volume criterion.

7. The method of claim 6, further comprising:

using region erosion on said nodule candidates to determine if said nodule candidates comprise one or more smaller structures.

8. The method of claim 1, wherein said step of deriving said features from said lung nodule candidates comprises one of:

applying a Hough transform in two or three dimensions on said identified structures to identify elongated or ellipsoidal nodule candidates having a high likelihood of corresponding to normal anatomy, applying radial gradient index analysis in two or three dimensions on said identified structures to identify false-positive nodule candidates, and applying similarity index analysis in two or three dimensions on said identified structures to compute a size of a nodule candidate relative to a distribution of sizes for neighboring nodule candidates; and said step of detecting said lung nodules comprises analyzing at least one of said Hough transform, said radial gradient index and similarity index to eliminate said false-positive nodule candidates from said nodule candidates.

9. The method of claim 8, wherein said step of applying radial gradient index analysis in two dimensions comprises:

obtaining contours in said segmented lung images for a plurality of gray-level increments, treating each pixel location in a segmented lung image as a center of a potential nodule, and calculating said radial gradient index (RGI) around each contour, where RGI is given by:

$$RGI = \left( \sum_{(x,y) \in M} \|\hat{G}(x, y)\| \right)^{-1} \sum_{(x,y) \in M} \hat{G}(x, y) \frac{\hat{r}(x, y)}{\|\hat{r}(x, y)\|}$$

where $\hat{G}(x, y)$ is a gradient vector of $f(x, y)$ at position $(x, y)$ along a margin defined by a contour and $\hat{r}(x,y)/\|\hat{r}(x,y)\|$ is a normalized radial vector at said position $(x, y)$; and said step of detecting said lung nodules comprises comparing said radial gradient index to a predetermined threshold to eliminate said false-positive nodule candidates from said nodule candidates.

10. The method of claim 8, wherein said step of applying radial gradient index analysis in three dimensions comprises:

obtaining surfaces in said segmented lung volume images for a plurality of gray-level increments, treating each pixel location in a segmented lung volume image as a center of a potential nodule, and calculating said radial gradient index (RGI) around each surface, where RGI is given by:

$$RGI = \left( \sum_{(x,y) \in M} \|\hat{G}(x, y)\| \right)^{-1} \sum_{(x,y) \in M} \hat{G}(x, y) \frac{\hat{r}(x, y)}{\|\hat{r}(x, y)\|}$$

where $\hat{G}(x, y)$ is a gradient vector of $f(x, y)$ at position $(x, y)$ along a margin defined by a surface and $\hat{r}(x,y)/\|\hat{r}(x,y)\|$ is a normalized radial vector at said position $(x, y)$; and said step of detecting said lung nodules comprises comparing said radial gradient index to a predetermined threshold to eliminate said false-positive nodule candidates from said nodule candidates.

11. The method of claim 8, wherein said step of applying similarity index analysis in two dimensions comprises:

determining contours in said in said segmented lung images, determining zones within said contours, and determining relative values of features of structures within said zones to discriminate between nodules and normal anatomy; and said step of detecting said lung nodules comprises comparing said relative values of features of structures to predetermined thresholds to eliminate said false-positive nodule candidates from said nodule candidates.

12. The method of claim 8, wherein said step of applying similarity index analysis in three dimensions comprises:

determining surfaces in said in said segmented lung volume images, determining zones within said surfaces, and determining relative values of features of structures within said zones to discriminate between nodules and normal anatomy, said features of structures including at least one of relative effective diameter, relative effective area, relative effective circularity and relative effective compactness; and said step of detecting said lung nodules comprises comparing said relative values of features of structures to predetermined thresholds to eliminate said false-positive nodule candidates from said nodule candidates.

13. The method of claim 8, wherein said step of deriving said features from said lung nodule candidates comprises:

determining features from said nodule candidates including at least one of structure volume, sphericity, radius of equivalent sphere, maximum compactness, maximum circularity, maximum eccentricity, mean gray level within structure, standard deviation of gray level and gray-level threshold at which structure volume first decreases below an upper volume bound; and said step of detecting said lung nodules comprises one of:

using rule based analysis on said determined features to eliminate said false-positive nodule candidates from said nodule candidates, and using an automated classifier on said determined features to eliminate said false-positive nodule candidates from said nodule candidates.

14. The method of claim 13, wherein said step of using said automated classifier comprises using one of a linear discriminant analysis classifier and neural network classifier.

15. The method of claim 1, wherein, prior to performing said step of generating said three-dimensional segmented lung volume images, a step of eliminating bright bands around a periphery of said two-dimensional segmented lung images using grey-level thresholding is performed.

16. A method for automated segmentation of lung regions from computed tomography (CT) image scans, comprising:

generating two-dimensional segmented lung images by segmenting a plurality of two-dimensional CT image sections derived from said CT image scans; and generating three-dimensional segmented lung volume images by combining said two-dimensional segmented lung images;

wherein said step of generating said segmented lung images comprises the steps of:

generating two-dimensional segmented thorax images by segmenting said plurality of two-dimensional CT image sections, including, applying gray-level thresholds to said CT image sections to determine thorax region contours therein; and generating said two-dimensional segmented lung images by segmenting said segmented thorax images, including, applying gray-level thresholds to said segmented thorax images to determine said lung region contours therein.

17. The method of claim 16, wherein said step of generating said segmented thorax images further comprises:

segmenting the trachea and main bronchi from said segmented thorax images using region growing.

18. The method of claim 16, wherein said step of generating said segmented lung images further comprises:

segmenting the diaphragm from said segmented lung images using diaphragm analysis.

19. The method of claim 16, wherein, prior to performing said step of generating said three-dimensional segmented lung volume images, a step of eliminating bright bands around a periphery of said two-dimensional segmented lung images using grey-level thresholding is performed.

20. A method for automated segmentation of lung nodules in computed tomography (CT) image scans, comprising:

generating two-dimensional segmented lung images by segmenting a plurality of two-dimensional CT image sections derived from said CT image scans;

generating three-dimensional segmented lung volume images by combining said two-dimensional segmented lung images; and determining three-dimensional lung nodule candidates from said three-dimensional segmented lung volume images, including, identifying structures within said three-dimensional segmented lung volume images that meet a volume criterion;

wherein said step of generating said segmented lung volume images comprises:

generating said segmented lung images at a plurality of gray levels thresholds; and combining said segmented lung images to generate segmented lung volume images at a plurality of gray levels corresponding to said grey level thresholds.

21. The method of claim 20, wherein said step of identifying said structures comprises:

grouping a pixel from a given segmented lung image with one or more pixels therein, one or more pixels from a segmented lung image above said given segmented lung image and one or more pixels from a segmented lung image below said given segmented lung image to determine a structure;

performing said step of grouping at said plurality of grey level thresholds;

computing a volume of all determined structures at said plurality of grey level thresholds; and determining said nodule candidates by comparing computed volumes of said determined structures at said plurality of gray levels with said volume criterion.

22. The method of claim 21, further comprising:

using region erosion on said nodule candidates to determine if said nodule candidates comprise one or more smaller structures.

23. The method of claim 20, wherein, prior to performing said step of generating said three-dimensional segmented lung volume images, a step of eliminating bright bands around a periphery of said two-dimensional segmented lung images using grey-level thresholding is performed.

24. A method for automated detection of lung nodules in computed tomography (CT) image scans, comprising:

generating two-dimensional segmented lung images by segmenting a plurality of two-dimensional CT image sections derived from said CT image scans;

generating three-dimensional segmented lung volume images by combining said two-dimensional segmented lung images;

determining three-dimensional lung nodule candidates from said three-dimensional segmented lung volume images, including, identifying structures within said three-dimensional segmented lung volume images that meet a volume criterion;

deriving features from said lung nodule candidates; and detecting lung nodules by analyzing said features to eliminate false-positive nodule candidates from said nodule candidates;

wherein said step of deriving said features from said lung nodule candidates comprises:

applying radial gradient index analysis in two or three dimensions on said identified structures to identify false-positive nodule candidates; and said step of detecting said lung nodules comprises analyzing said radial gradient index to eliminate said false-positive nodule candidates from said nodule candidates.

25. The method of claim 24, wherein said step of applying radial gradient index analysis in two dimensions comprises:

obtaining contours in said segmented lung images for a plurality of gray-level increments, treating each pixel location in a segmented lung image as a center of a potential nodule, and calculating said radial gradient index (RGI) around each contour, where RGI is given by:

$$RGI = \left(\sum_{(x,y)\in M} \|\hat{G}(x,y)\|\right)^{-1} \sum_{(x,y)\in M} \hat{G}(x,y) \frac{\hat{r}(x,y)}{\|\hat{r}(x,y)\|}$$

where $\hat{G}(x, y)$ is a gradient vector of $f(x, y)$ at position $(x, y)$ along a margin defined by a contour and $\hat{r}(x,y)/\|\hat{r}(x,y)\|$ is a normalized radial vector at said position $(x, y)$; and said step of detecting said lung nodules comprises comparing said radial gradient index to a predetermined threshold to eliminate said false-positive nodule candidates from said nodule candidates.

26. The method of claim 24, wherein said step of applying radial gradient index analysis in three dimensions comprises:

obtaining surfaces in said segmented lung volume images for a plurality of gray-level increments, treating each pixel location in a segmented lung volume image as a center of a potential nodule, and calculating said radial gradient index (RGI) around each surface, where RGI is given by:

$$RGI = \left(\sum_{(x,y)\in M} \|\hat{G}(x, y)\|\right)^{-1} \sum_{(x,y)\in M} \hat{G}(x, y) \frac{\hat{r}(x, y)}{\|\hat{r}(x, y)\|}$$

where $\hat{G}(x, y)$ is a gradient vector of $f(x, y)$ at position $(x, y)$ along a margin defined by a surface and $\hat{r}(x,y)/\|\hat{r}(x,y)\|$ is a normalized radial vector at said position $(x, y)$; and said step of detecting said lung nodules comprises comparing said radial gradient index to a predetermined threshold to eliminate said false-positive nodule candidates from said nodule candidates.

27. The method of claim 24, wherein, prior to performing said step of generating said three-dimensional segmented lung volume images, a step of eliminating bright bands around a periphery of said two-dimensional segmented lung images using grey-level thresholding is performed.

28. A method for automated detection of lung nodules in computed tomography (CT) image scans, comprising:

generating two-dimensional segmented lung images by segmenting a plurality of two-dimensional CT image sections derived from said CT image scans;

generating three-dimensional segmented lung volume images by combining said two-dimensional segmented lung images;

determining three-dimensional lung nodule candidates from said three-dimensional segmented lung volume images, including, identifying structures within said three-dimensional segmented lung volume images that meet a volume criterion;

deriving features from said lung nodule candidates; and detecting lung nodules by analyzing said features to eliminate false-positive nodule candidates from said nodule candidates;

wherein said step of deriving said features from said lung nodule candidates comprises:

applying similarity index analysis in two or three dimensions on said identified structures to compute a size of a nodule candidate relative to a distribution of sizes for neighboring nodule candidates; and said step of detecting said lung nodules comprises analyzing said similarity index to eliminate said false-positive nodule candidates from said nodule candidates.

29. The method of claim 28, wherein said step of applying similarity index analysis in two dimensions comprises:

determining contours in said in said segmented lung images, determining zones within said contours, and determining relative values of features of structures within said zones to discriminate between nodules and normal anatomy; and said step of detecting said lung nodules comprises comparing said relative values of features of structures to predetermined thresholds to eliminate said false-positive nodule candidates from said nodule candidates.

30. The method of claim 28, wherein said step of applying similarity index analysis in three dimensions comprises:

determining surfaces in said in said segmented lung volume images, determining zones within said surfaces, and determining relative values of features of structures within said zones to discriminate between nodules and normal anatomy, said features of structures including at least one of relative effective diameter, relative effective area, relative effective circularity and relative effective compactness; and said step of detecting said lung nodules comprises comparing said relative values of features of structures to predetermined thresholds to eliminate said false-positive nodule candidates from said nodule candidates.

31. The method of claim 28, wherein, prior to performing said step of generating said three-dimensional segmented lung volume images, a step of eliminating bright bands around a periphery of said two-dimensional segmented lung images using grey-level thresholding is performed.

32. A method for automated analysis of features of lung nodules in computed tomography (CT) image scans, comprising:

generating two-dimensional segmented lung images by segmenting a plurality of two-dimensional CT image sections derived from said CT image scans;

generating three-dimensional segmented lung volume images by combining said two-dimensional segmented lung images;

determining three-dimensional lung nodule candidates from said three-dimensional segmented lung volume images, including, identifying structures within said three-dimensional segmented lung volume images that meet a volume criterion; and deriving features from said lung nodule candidates;

wherein said step of deriving said features from said lung nodule candidates comprises:

determining features from said nodule candidates including at least one of structure volume, sphericity, radius of equivalent sphere, maximum compactness, maximum circularity, maximum eccentricity, mean gray level within structure, standard deviation of gray level and gray-level threshold at which structure volume first decreases below an upper volume bound.

33. The method of claim 32, further comprising:

using rule based analysis on said determined features to eliminate false-positive nodule candidates from said nodule candidates; and using an automated classifier on said determined features to eliminate said false-positive nodule candidates from said nodule candidates.

34. The method of claim 33, wherein said step of using said automated classifier comprises:

using one of a linear discriminant analysis classifier and neural network classifier.

35. The method of claim 32, wherein, prior to performing said step of generating said three-dimensional segmented lung volume images, a step of eliminating bright bands around a periphery of said two-dimensional segmented lung images using grey-level thresholding is performed.

36. An image processing system configured to perform the steps recited in one of claims 1 to 35.

37. A storage medium storing a program for performing the steps recited in one of claims 1 to 35.

* * * * *